(12) United States Patent
Yang et al.

(10) Patent No.: US 11,661,347 B2
(45) Date of Patent: May 30, 2023

(54) PREPARATION OF GRAPHENE OXIDE AEROGEL BEADS AND APPLICATIONS THEREOF

(71) Applicant: The Hong Kong University of Science and Technology, Hong Kong (CN)

(72) Inventors: Jinglei Yang, Hong Kong (CN); Jinliang Zhao, Hong Kong (CN); Xiaming Feng, Cincinnati, OH (US)

(73) Assignee: The Hong Kong University of Science and Technology, Hong Kong (CN)

( * ) Notice: Subject to any disclaimer, the term of this patent is extended or adjusted under 35 U.S.C. 154(b) by 842 days.

(21) Appl. No.: 16/597,185

(22) Filed: Oct. 9, 2019

(65) Prior Publication Data

US 2020/0115233 A1    Apr. 16, 2020

Related U.S. Application Data

(60) Provisional application No. 62/766,264, filed on Oct. 11, 2018.

(51) Int. Cl.
*C01B 32/198* (2017.01)
*C02F 1/14* (2023.01)
(Continued)

(52) U.S. Cl.
CPC ......... *C01B 32/198* (2017.08); *B01J 13/0091* (2013.01); *B01J 13/046* (2013.01);
(Continued)

(58) Field of Classification Search
None
See application file for complete search history.

(56) References Cited

U.S. PATENT DOCUMENTS 8,222,321 B2    7/2012  Youm et al.
8,273,474 B2    9/2012  Al-Hallaj et al.
(Continued)

OTHER PUBLICATIONS

Meng Et al. Generation of graphene-based aerogel microspheres for broadband and tunable high-performance microwave absorption by electrospinning-freeze drying process, Key Laboratory of Advanced Technologies of Materials (Ministry of Education), School of Materials Science and Engineering, Southwest Ji.*
(Continued)

*Primary Examiner* — Jeffrey D Washville
(74) *Attorney, Agent, or Firm* — Saliwanchik, Lloyd & Eisenschenk

(57) ABSTRACT

Graphene oxide aerogel beads (GOABs) are formed that have a core/shell structure where a smooth shell covers a multi-layer core. The smooth shell and the layers of the multilayer core comprise graphene oxide or reduced graphene oxide. The GOABs can include a phase-change material encapsulated within the multi-layer core. The GOABs can be combined or decorated with $Fe_3O_4$ nanoparticles or $MoS_2$ microflakes for various applications. The GOABs are formed from aqueous slurries of graphene oxide that is extruded as drops into an aqueous solution of a coagulant where GOABs are formed. The GOABs are washed and freeze dried, after which, the GOABs can be reduced as desired by chemical or thermal means. Impregnation can be carried out with the phase-change material.

21 Claims, 20 Drawing Sheets

(51) Int. Cl.
*C01B 32/184* (2017.01)
*B01J 13/00* (2006.01)
*B01J 13/04* (2006.01)
*C09K 5/06* (2006.01)

(52) U.S. Cl.
CPC .............. *C01B 32/184* (2017.08); *C02F 1/14* (2013.01); *C01P 2004/03* (2013.01); *C09K 5/063* (2013.01)

(56) References Cited

U.S. PATENT DOCUMENTS

| | | | |
|---|---|---|---|
| 9,318,192 | B2 | 4/2016 | Kruglick |
| 9,399,866 | B2 | 7/2016 | Alawadhi |
| 9,408,336 | B1 | 8/2016 | Zang et al. |
| 9,505,903 | B2 | 11/2016 | Lee et al. |
| 9,614,263 | B2 | 4/2017 | Yang et al. |
| 9,674,992 | B2 | 6/2017 | Cheng |
| 9,716,299 | B2 | 7/2017 | Balandin |
| 9,792,961 | B2 | 10/2017 | Arora et al. |
| 9,903,616 | B2 | 2/2018 | Chueh et al. |
| 10,005,941 | B2 | 6/2018 | Razack et al. |
| 10,011,694 | B2 | 7/2018 | Chan et al. |
| 10,065,868 | B2 | 9/2018 | Alshahrani |
| 10,091,917 | B2 | 10/2018 | Kim et al. |
| 2011/0070635 | A1 | 3/2011 | King et al. |
| 2020/0056081 | A1* | 2/2020 | Khe .................. C09K 5/14 |

OTHER PUBLICATIONS

Aris, A.M. et al., "An experimental study of a lithium ion cell operation at low temperature conditions", Energy Procedia, 2017, 110:128-135, Elsevier Ltd.
Bandhauer, T.M. et al., "A Critical Review of Thermal Issues in Lithium-Ion Batteries", Journal of The Electrochemical Society, 2011, 158(3):R1-R25, The Electrochemical Society.
Liu, C. et al., "Advanced Materials for Energy Storage", Advanced Materials, 2010, 22:E28-E62, WILEY-VCH Verlag GmbH & Co. KGaA, Weinheim.
Saito, A., "Recent advances in research on cold thermal energy storage", 2002, International Journal of Refrigeration, 25:177-189, Elsevier Science Ltd and IIR.
Al Hallaj, S. et al., "A Novel Thermal Management System for Electric Vehicle Batteries Using Phase-Change Material", Journal of The Electrochemical Society, 2000, 147(9):3231-3236, The Electrochemical Society, Inc.
Fan, L. et al., "Thermal conductivity enhancement of phase change materials for thermal energy storage: A review", Renewable and Sustainable Energy Reviews, 2011, 15:24-46, Elsevier Ltd.
Xiao, M. et al., "Preparation and performance of shape stabilized phase change thermal storage materials with high thermal conductivity", Energy Conversion and Management, 2002, 43:103-108, 2001 Elsevier Science Ltd.
Mochane, M.J. et al., "The Effect of Expanded Graphite on the Thermal Stability, Latent Heat, and Flammability Properties of EVA/Wax Phase Change Blends", Polymer Engineering and Science, 2015, pp. 1255-1262, Society of Plastics Engineers.
Nofal, M. et al., "Selective Laser Sintering of Phase Change Materials for Thermal Energy Storage Applications", Procedia Manufacturing, 2017, 10:851-865, Elsevier B.V.
Zhang, Z. et al., "Study on paraffin/expanded graphite composite phase change thermal energy storage material", Energy Conversion and Management, 2006, 47:303-310, 20005 Elsevier Ltd.
Ma, G. et al., Preparation and Properties of Stearic Acid—Acetanilide Eutectic Mixture/Expanded Graphite Composite Phase-Change Material for Thermal Energy Storage, Energy Technology, 2018, 6:153-160, Wiley-VCH Verlag GmbH & Co. KGaA, Weinheim.
Sari, A., "Form-stable paraffin/high density polyethylene composites as solid-liquid phase change material for thermal energy storage: preparation and thermal properties", Energy Conversion and Management, 2004, 45:2033-2042, 2003 Elsevier Ltd.
Sari, A. et al., "Thermal conductivity and latent heat thermal energy storage characteristics of paraffin/expanded graphite composite as phase change material", Applied Thermal Engineering, 2007, 27:1271-1277, 2006 Elsevier Ltd.
Yang, X. et al., "Preparation and properties of myristic-palmitic-stearic acid/expanded graphite composites as phase change materials for energy storage", Solar Energy, 2014, 99:259-266, 2013 Elsevier Ltd.
Zhong, Y. et al., "Heat transfer enhancement of paraffin wax using compressed expanded natural graphite for thermal energy storage", CARBON, 2010, 48:300-304, 2009 Elsevier Ltd.
Duan, Z.J. et al., "$CaCl_2|6H_2O$/Expanded graphite composite as form-stable phase change materials for thermal energy storage", J Therm Anal Calorim, 2014, 115:111-117, Akade'miai Kiado', Budapest, Hungary 2013.
Zhong, L. et al., "Preparation and thermal properties of porous heterogeneous composite phase change materials based on molten salts/expanded graphite", Solar Energy, 2014, 107:63-73, Elsevier Ltd.
Wu, W. et al., "Preparation and thermal conductivity enhancement of composite phase change materials for electronic thermal management", Energy Conversion and Management, 2015, 10:278-284, Elsevier Ltd.
Lin, C. et al., "Experiment and simulation of a $LiFePO_4$ battery pack with a passive thermal management system using composite phase change material and graphite sheets", Journal of Power Sources, 2015, 275:742-749, 2014 Elsevier B.V.
Sedeh, M.M. et al., "Thermal conductivity improvement of phase change materials/graphite foam composites", CARBON, 2013, 60:117-128, Elsevier Ltd.
Mills, A. et al., "Thermal conductivity enhancement of phase change materials using a graphite matrix", Applied Thermal Engineering, 2006, 26:1652-1661, 2005 Elsevier Ltd.
Zhong, Y. et al., "Heat transfer enhancement of paraffin wax using graphite foam for thermal energy storage", Solar Energy Materials & Solar Cells, 2010, 94:1011-1014, Elsevier B.V.
Mu, B. et al., "Fabrication and thermal properties of tetradecanol/graphene aerogel form-stable composite phase change materials", Scientific Reports, 2018, 8:8878, 14 pages.
Xue, J. et al., "Integration of Phase-Change Materials with Electrospun Fibers for Promoting Neurite Outgrowth under Controlled Release", Advanced Functional Materials, 2018, 28, 1705563, 11 pages, WILEY-VCH Verlag GmbH & Co. KGaA, Weinheim.
Zhang, Q. et al., "Experimental and numerical investigations on a flexible paraffin/fiber composite phase change material for thermal therapy mask", Energy Storage Materials, 2017, 6:36-45, 2016 Elsevier B.V.
Wang, Y. et al., "Single-Walled Carbon Nanotube/Phase Change Material Composites: Sunlight-Driven, Reversible, Form-Stable Phase Transitions for Solar Thermal Energy Storage", Advanced Functional Materials, 2013, 23:4354-4360, WILEY-VCH Verlag GmbH & Co. KGaA, Weinheim.
Goli, P. et al., "Graphene-enhanced hybrid phase change materials for thermal management of Li-ion batteries", Journal of Power Sources, 2014, 248:37-43, 2013 Elsevier B.V.
Li, J.F et al., "Simultaneous enhancement of latent heat and thermal conductivity of docosane-based phase change material in the presence of spongy graphene", Solar Energy Materials & Solar Cells, 2014, 128:48-51, Elsevier B.V.
Warzoha, R.J. et al., "Improved heat recovery from paraffin-based phase change materials due to the presence of percolating graphene networks", International Journal of Heat and Mass Transfer, 2014, 79:314-323, Elsevier Ltd.
Khateeb, S.A. et al., "Design and simulation of a lithium-ion battery with a phase change material thermal management system for an electric scooter", Journal of Power Sources, 2004, 128:292-307, 2003 Elsevier B.V.
Bao, C. et al., "Graphene oxide beads for fast clean-up of hazardous chemicals", Journal of Materials Chemistry A, 2016, 4:9437-9446, The Royal Society of Chemistry.

(56) References Cited

OTHER PUBLICATIONS

Zeng, J.L. et al., "Tetradecanol/expanded graphite composite form-stable phase change material for thermal energy storage", Solar Energy Materials & Solar Cells, 2014, 127:122-128, Elsevier B.V.

Vélez, C. et al., "Thermal properties of n-pentadecane, n-heptadecane and n-nonadecane in the solid/liquid phase change region", International Journal of Thermal Sciences, 2015, 94:139-146, Elsevier Masson SAS.

Gandolfo, F.G. et al., "Phase diagram of mixtures of stearic acid and stearyl alcohol", Thermochimica Acta, 2003, 404:9-17, Elsevier Science B.V.

Feng, X. et al., "Novel onion-like graphene aerogel beads for efficient solar vapor generation under non-concentrated illumination", Journal of Materials Chemistry A, 2019, 7:4400-4407, The Royal Society of Chemistry.

\* cited by examiner

PREPARATION OF GRAPHENE OXIDE AEROGEL BEADS AND APPLICATIONS THEREOF

CROSS-REFERENCE TO RELATED APPLICATION

This application claims the benefit of U.S. Provisional Application Ser. No. 62/766,264, filed Oct. 11, 2018, which is hereby incorporated by reference in its entirety including any tables, figures, or drawings.

BACKGROUND OF THE INVENTION

Lithium-ion (Li-ion) batteries have become the prime option as the power source for electric vehicles (EVs), hybrid electric vehicles (HEVs) and battery electric vehicles (BEVs) due to their high energy density, high cost competitiveness, and ability to be scaled up safely. Li-ion batteries normally work at optimal operation condition between 20 to 35° C. Below or above this range, either low performance or self-discharge by non-reversible actions can occur. Therefore, high-efficient and safe thermal management materials are highly desired for maintaining the optimum temperature range for Li-ion batteries. Thermal energy storage materials, such as phase-change materials (PCMs), play a key role in efficient, clean, and versatile use of energy and are crucial for adjusting the time discrepancy between power supply and demand. Excess thermal energy is stored in a material as latent heat by warming up or melting the material. The stored thermal energy is utilized later by cooling the material. PCMs are perfect candidates for Li-ion battery thermal management due to their high energy density, wide tunable temperature range and cost-effectiveness.

The widespread use of personal computers and portable electronics has resulted in severe electromagnetic interference (EMI) pollutions. EMI radiations in free spaces and radiation emanating from these pervasive sources are harmful to both human health and the normal operation of electronics. Therefore, various EMI-shielding materials have been developed to eliminate unwanted electromagnetic (EM) radiations as well as to protect neighboring components in electronic devices.

Lack of renewable sustainable energies and shortage of clean water supply are the two major challenges in today's human society. Solar energy is one of the most abundant and readily available renewable energy sources, and advanced technologies have been developed to harvest solar energy, such as photovoltaic cells and solar thermal techniques. Solving the clean water crisis is as important as creating renewable energies. Worldwide, 844 million people do not have access to clean water with one in nine people living with water unsafe for human consumption. Among many potential solutions, solar vapor generation for desalination and sewage treatment is regarded a promising approach.

Early in 2000, Al Hallaj et al., *J. Electrochem. Soc.* (2000), proposed using PCMs as passive thermal management for Li-ion batteries in electrovoltaic devices EVs. However, low thermal conductivity, flammability, and limited volumetric energy storage density are disadvantages of some inorganic PCMs. Some specific techniques aiming at reducing the undesirable features of paraffin are developed by modifying the wax and the storage unit, such as by introducing thermally-conductive fillers, microencapsulation and shape-stabilization. Various materials have been investigated to increase the thermal conductivity while maintaining the shape or form stability during the solid-liquid phase transitions. These materials include expanded graphite (EG), graphite, carbon fibers, carbon nanotubes, graphene, metal foams and molten salts. Among these candidates, EG is probably the most well studied over the last decade. In 2002, Xiao et al., *Energy Convers. Manag.* 43, 103-108 (2002), introduced EG into shape-stabilized PCM to maintain 80% of the pure PCM's latent heat and allow 3-5 times the thermal response speed. A stearic acid-acetanilide eutectic mixture/EG composite PCM shows high latent heat of 176.16 J·g−1 with 14.5 times the thermal conductivity of pure PCM's thermal conductivity. By compressing the EG by various densities, a paraffin wax/EG composites obtains 28-180 times the thermal conductivity of the pure paraffin wax. An inorganic PCM, calcium chloride hexahydrate was also encapsulated by EG to gain 14 times of thermal conductivity, however, the mass concentration is limited to 50% to remain form-stable. Sari et al., *Appl. Therm. Eng.* 27, 1271-1277 (2007), concluded that a minimum mass fraction of 10% is necessary for the PCM/EG composite to be form-stable, which limits the overall energy density. In addition, most directly applied PCM/EG composites are bulk materials with little disclosure concerning their mechanical properties, which, for power battery packs are essential as safety factors. Moreover, typically the electrical properties were not disclosed, even though poor thermal transfer has a bad influence on the performance of the batteries.

Hybrid nanocomposites consisting of CNTs and graphene have been fabricated to explore synergies arising from each constituent. The in-situ growth of CNTs on reduced graphene oxide (rGO) allow CNT/rGO/poly(dimethylsiloxane) (PDMS) composites that show a moderate EMI shielding effectiveness (SE) of 10 dB at 8 GHz with a total filler content of 10 wt. %. Multi-walled CNT (MWCNT)/graphite nanoplate (GNP)/polystyrene (PS) nanocomposites prepared by in-situ polymerization of styrene/MWCNTs in the presence of suspension polymerized PS/GNP microbeads result in hybrid composites with moderate filler contents of ~2.0 wt % MWCNTs and ~1.5 wt % GNPs that display a commercially applicable SE of 20.2 dB. MWCNT/GNP/polypropylene composites with 10 wt % of each filler, which are fabricated by simple mixing, deliver an improved SE of 36.5 dB at 1250 MHz and a volume resistivity of 0.4 Ωcm. These hybrid composites provide limited EMI shielding performance because they possess only low electrical conductivities and lacked seamless conducting networks.

Though remarkable progress has been made towards improving the solar vapor generation rate and conversion efficiency through the use of advanced solar absorber materials, many challenges remain in practical applications. For instance, metallic nanoparticles and nanorods were dispersed in aqueous solutions to enhance the heat localization performance. However, their high cost, low conversion efficiency, and potential safety problem have limited their use. Recently, a new approach of floating solar absorbers on the surface of water where available heat is localized to facilitate water evaporation without losing heat has been demonstrated that achieves efficient solar evaporation properties. A variety of materials and structures employed in rational designs have established enhanced light absorbing performance that can be commercialized. These materials and structures include plasmonic wood, 3D printed structures, carbonized stuffs, paper-based systems, and polymer foams. Nevertheless, most of these light absorbers display lackluster efficiencies or require complex processes for fabrication that have limited scalability for mass production.

BRIEF SUMMARY OF THE INVENTION

An embodiment of the invention is directed to graphene oxide aerogel beads (GOABs) having a core/shell structure where a smooth shell covers a multi-layer core. The smooth shell and the layers of the multilayer core comprise graphene oxide or reduced graphene oxide. The layers of the multi-layer core are separated by about 1-50 μm. The GOABs can have an average diameter of 0.1 to 10 mm depending on fabrication parameters. In an embodiment of the invention, the GOABs include a phase-change material encapsulated within the multi-layer core. The phase-change material can be a wax, such as, but not limited to tetradecanol. The GOABs can be combined or decorated with $Fe_3O_4$ nanoparticles. $MoS_2$ microflakes can be included on and within the GOABs.

An embodiment of the invention is directed to a method of preparing GOABs where aqueous slurries of graphene oxide are extruded as drops into a coagulation bath containing an aqueous solution of a coagulant. The graphene oxide can be extruded by wet-spinning or electrospinning and the coagulant can be, but is not limited to, CTAB or PEI. The GOABs are removed from the coagulation bath fluid and washed with water and freeze dried. The GOABs can be converted to reduced GOABs (rGOABs). Reduction can be by thermal or chemical means. A chemical reducing agent can be a sodium ascorbate solution. Thermal reduction occurs at temperatures in excess of 1,000° C. The GOABs can be impregnated with a phase-change material, which can be carried out by exposing the GOABs to vacuum to form evacuated GOABs and infusing the evacuated GOABs with a liquid phase-change material.

A device comprising the GOABs can be fabricated as an EMI shielding film, a solar still, or thermal management devices, for a battery or other devices. The device can be the GOABs in an electrically insulating matrix, such as, but not limited to, a silicone network.

DETAILED DISCLOSURE OF THE INVENTION

Figure 1A:
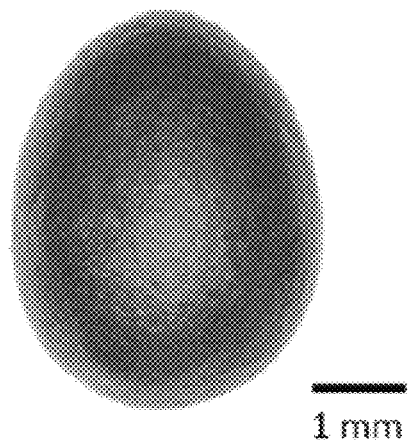
FIG. 1A shows an optical microscopy image of a GOAB, according to an embodiment of the invention.
Figure 1B:
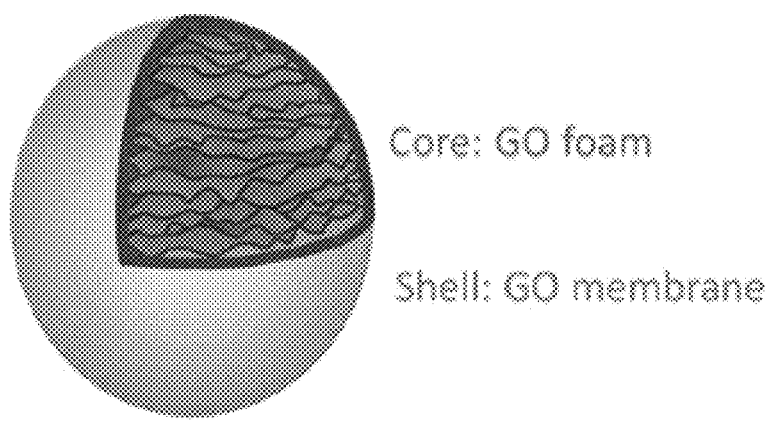
FIG. 1B is a drawing of a GOAB's core/shell structure, according to an embodiment of the invention.
Figure 1C:
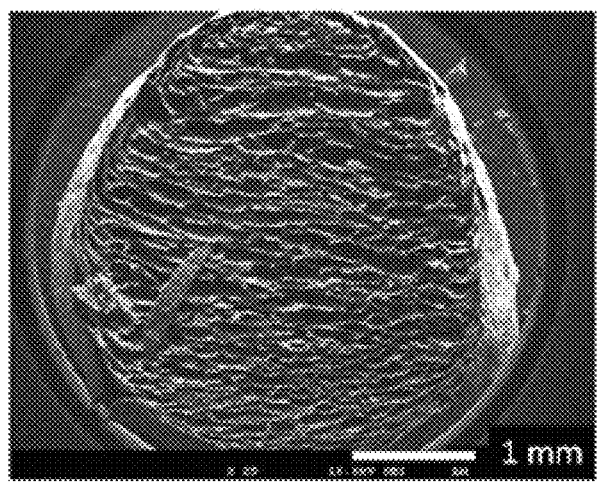
FIG. 1C shows a SEM image of the cross section of a GOAB, according to an embodiment of the invention.
Figure 1D:
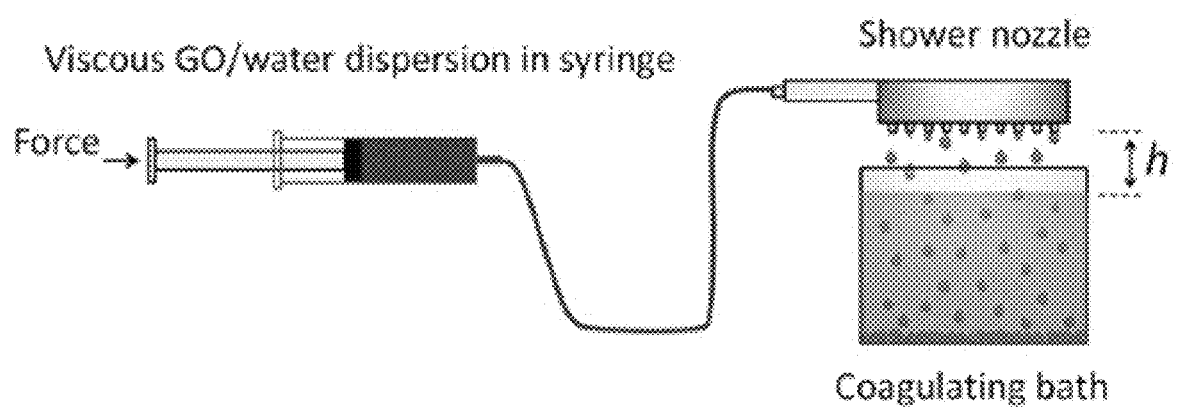
FIG. 1D shows a device for preparation of the GOABs, according to an embodiment of the invention.
Figure 1E:
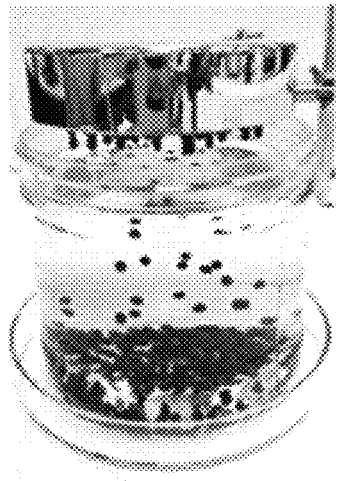
FIG. 1E shows a photograph during production of GOABs, where a 1.5 wt % GO in water suspension drips into the coagulation bath with 1 wt % aqueous CTAB solution to form the GOABs, according to an embodiment of the invention.
Figure 1F:
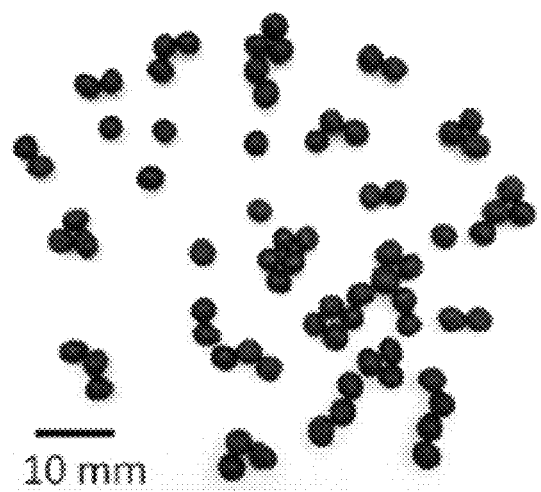
FIG. 1F shows a photograph of the GOABs, according to an embodiment of the invention, formed as in FIG. 1E.
Figure 2:
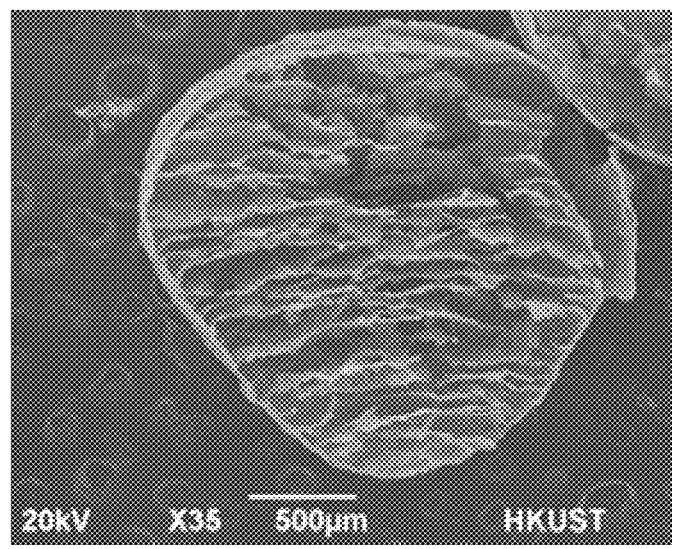
FIG. 2 shows a SEM image of a rGOAB with empty porous networkcore, according to an embodiment of the invention.
Figure 3A:
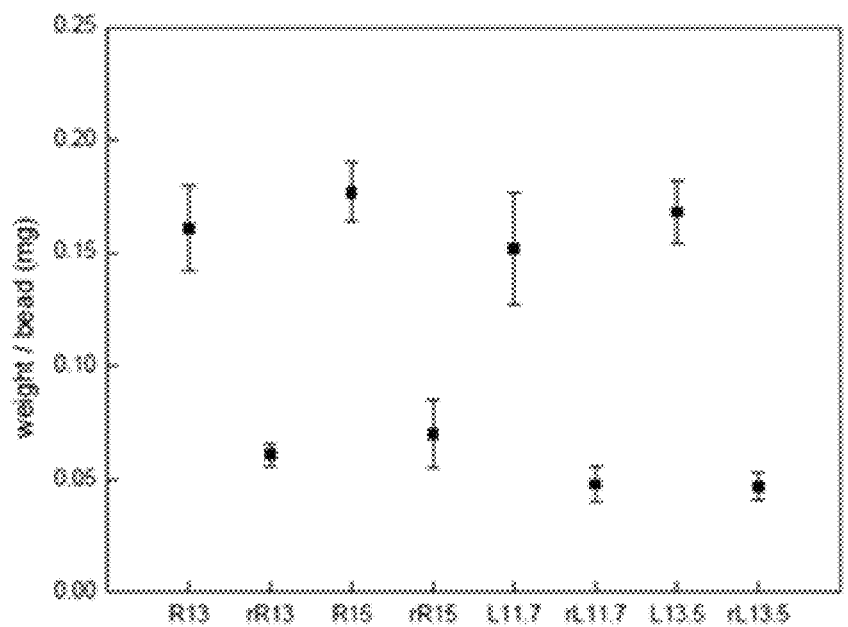
FIG. 3A shows plot weights of the GOABs and rGOABs therefrom for four masses of beads: R13=13 mg/mL, R15=15 mg/mL; L11.7=11.7 mg/mL, and L13.5=13.5 mg/mL.
Figure 3B:
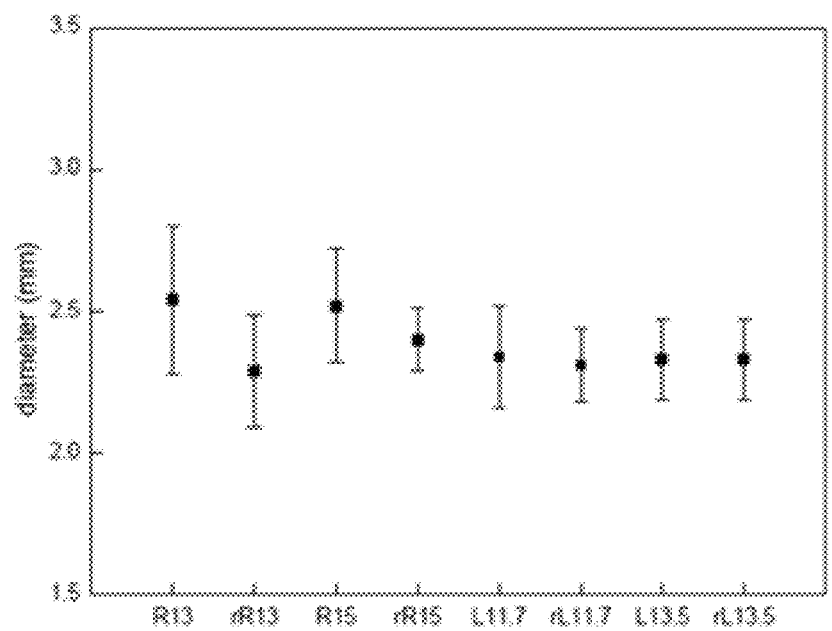
FIG. 3B shows a plot of the diameters of the GOABs and rGOABs therefrom of FIG. 3A.
Figure 3C:
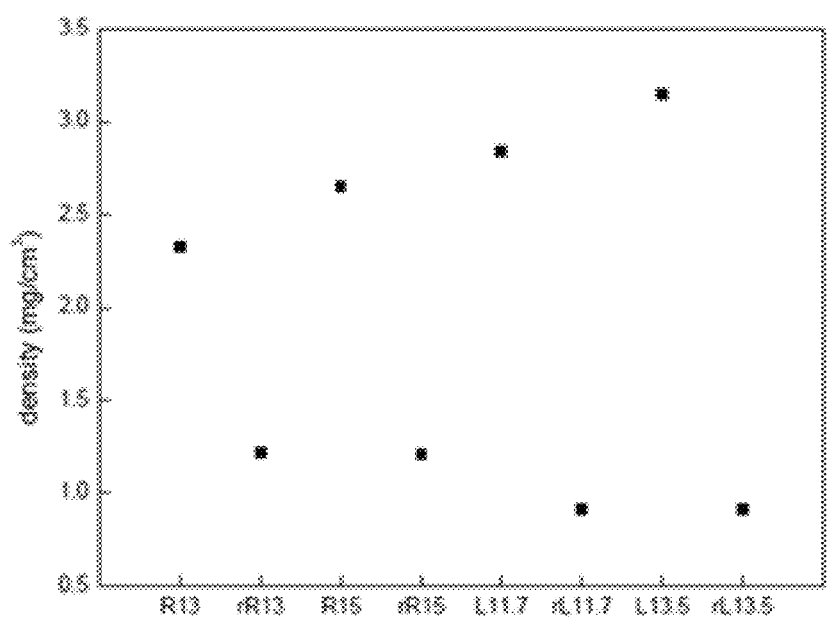
FIG. 3C shows a plot of the densities of the GOABs and rGOABs therefrom of FIG. 3A.

Embodiments of the invention are directed to graphene oxide aerogel beads (GOABs) and reduced graphene oxide aerogel beads (rGOABs). GOABs beads can be of about 3 mm in cross-section or diameter, as shown in FIG. 1A, to about 14 mm in cross-section, and can display a core/shell structure as shown in FIGS. 1B and 1C. In an embodiment of the invention GOABs can be prepared, as shown in FIGS. 1D and 1E by extruding a dispersion of graphene oxide (GO), for example 1 to 5 wt % GO in water, through at least one nozzle to form droplets that fall into a coagulation bath, for example, a 1 wt % solution of CTAB or PEI, where the GO beads form, as shown in FIG. 1F. The GOABs can be reduced to rGOABs by thermal treatment at temperatures in excess of 1,000° C. The rGOABs retain much of the core/shell structure of the GOABs, as shown in FIG. 2. The GOABs lose mass upon reduction to rGOABs, as indicated in FIG. 3A, with little reduction in bead diameter, as indicated in FIG. 3B, where larger beads shrink to a less extent. This is reflected in the change in density of the rGOABs relative to the GOABs, as indicated in FIG. 3C.

Figure 4A:
FIG. 4A shows a photograph of a rGOABs with a TD filled porous networkcore, according to an embodiment of the invention.
Figure 4B:
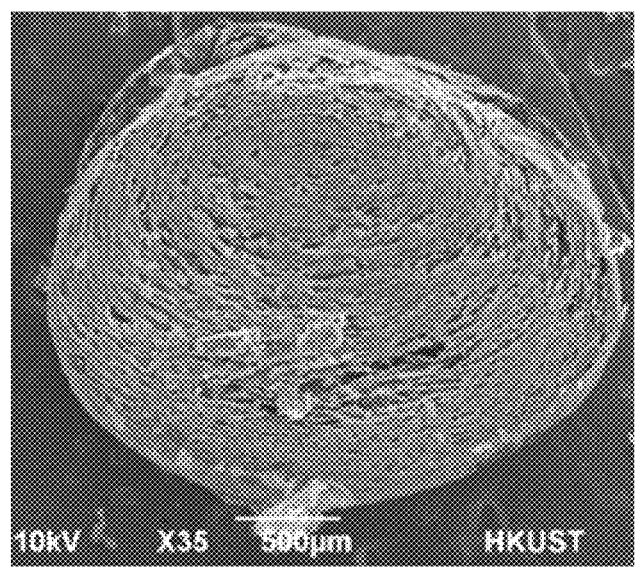
FIG. 4B shows a SEM image of a cross-section of an rGOAB with a TD filled porous networkcore, according to an embodiment of the invention.
Figure 4C:
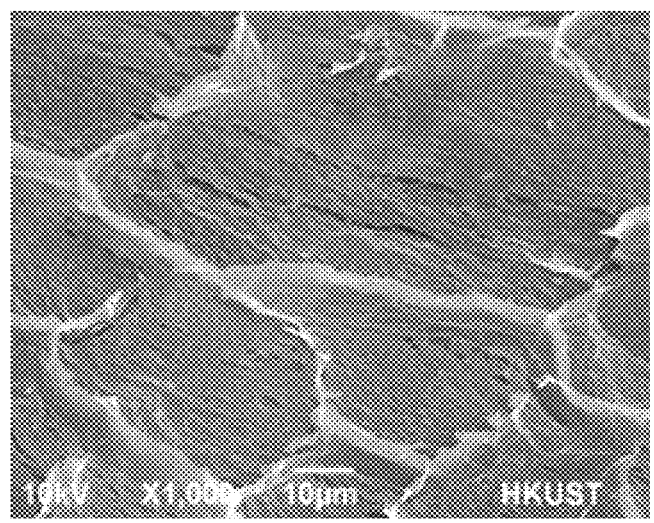
FIG. 4C shows a SEM image of a rGOAB with a TD filled porous networkcore of FIG. 4B at high magnification, according to an embodiment of the invention.
Figure 4D:
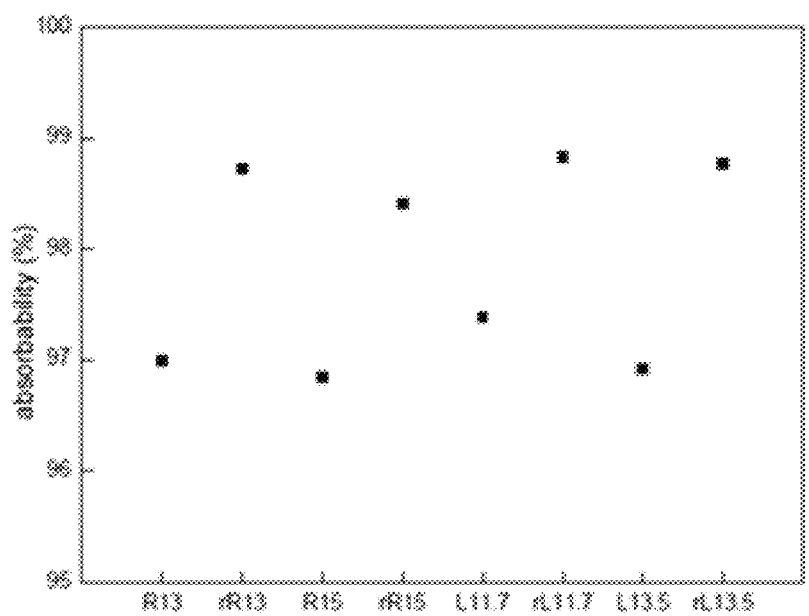
FIG. 4D shows a plot of the absorbability of TD in the GOABs and rGOABs therefrom to form the composite beads of FIG. 4A, according to an embodiment of the invention.
Figure 5A:
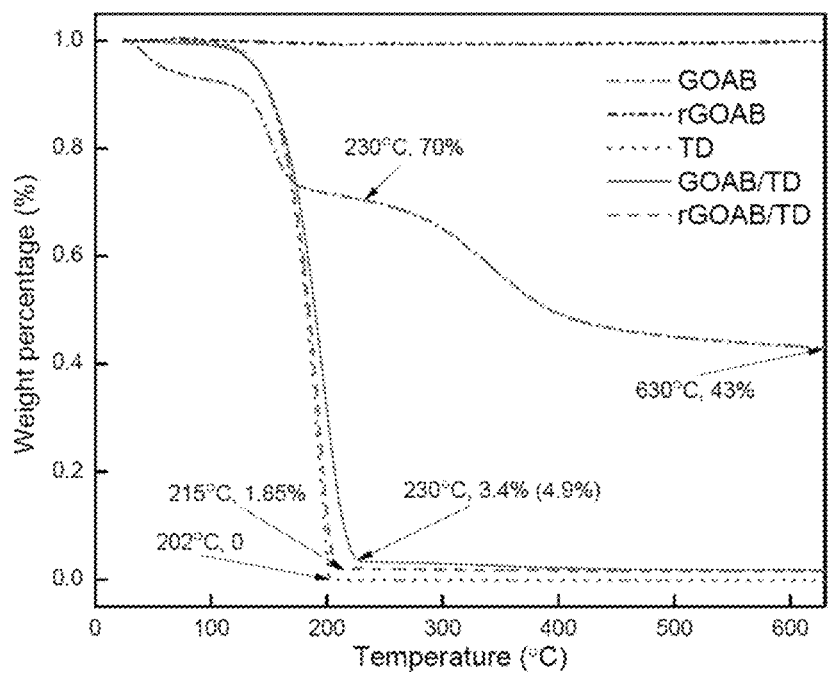
FIG. 5A shows TGA plots of GOAB, rGOAB, TD, GOAB/TD and rGOAB/TD under a heating rate of 20° C./min in nitrogen atmosphere.
Figure 5B:
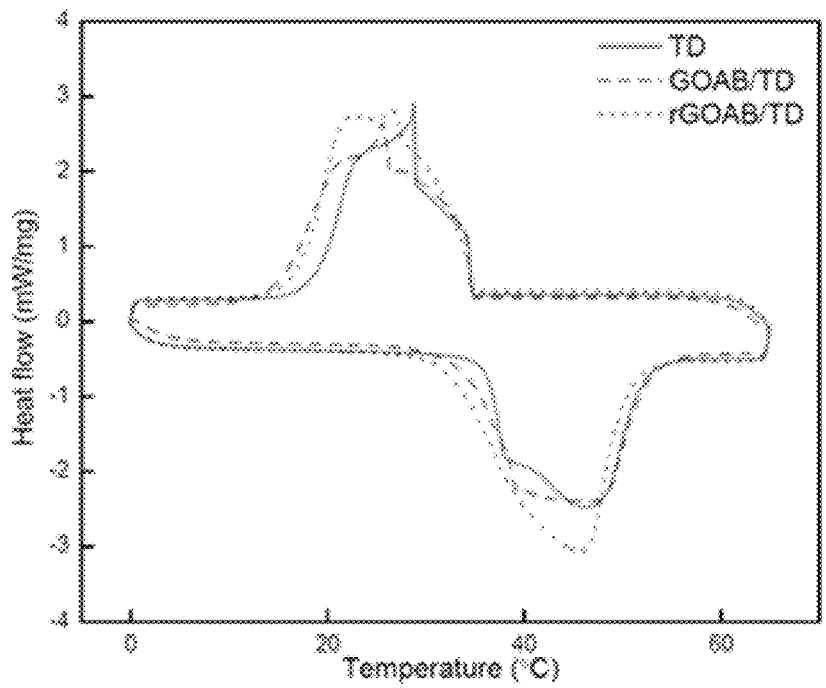
FIG. 5B shows DSC plots for TD, GOAB/TD and rGOAB/TD under a heating rate of 2° C./min.
Figure 5C:
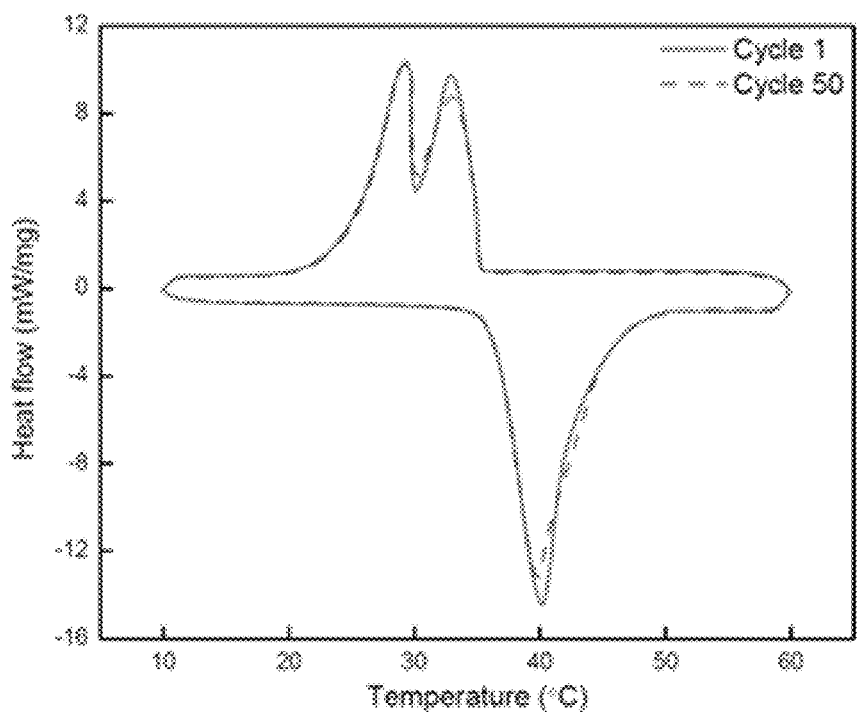
FIG. 5C shows DSC plots for TD, GOAB/TD and rGOAB/TD for thermal cycling under a heating rate of 20° C./min.

The rGOABs can be impregnated with tetradecanol (TD), other crystalizable waxes, or other crystalizable hydrated salt, as shown in FIG. 4A, where the microporous network within the rGOAB can be fully occupied with the phase-change material, as shown in FIG. 4B. The absorbability of TD in the GOABs are less than that of the rGOABs for all sizes of the GOABs and rGOABs formed from the GOABs, as shown in FIG. 4C. As indicated in FIG. 5A, the rGOAB/TD composite contains about 98.15% mass fraction of the PCM, which is the highest achieved for dimensionally stable PCM composites. These rGOAB/TD composites display a latent heat of 224 J/g on average, and are stable after 50 heating-cooling cycles, as indicated in FIG. 5C. These GOAB/TD composites can be more broadly applied compared to previously reported bulky PCM composites and can be incorporated directly into appropriate matrix, which are electrically insulating yet thermally conductive while maintaining good mechanical strength to achieve practical industrial goals.

Figure 6:
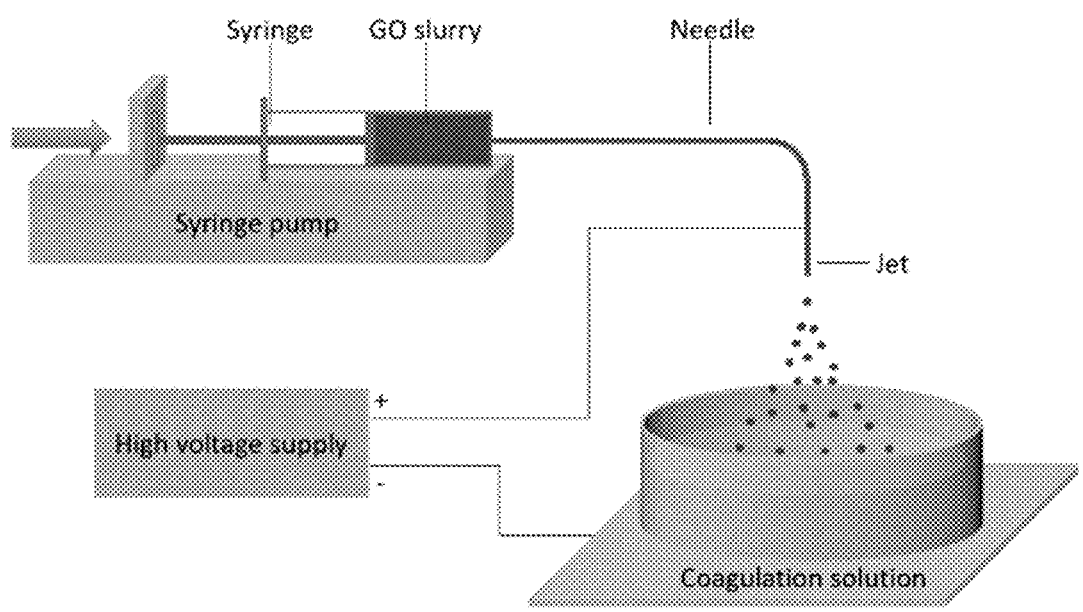
FIG. 6 is a drawing to illustrate an apparatus for electrospinning of micro-sized GOABs, according to an embodiment of the invention.

In an embodiment of the invention, the GOABs can be formed in an electrospinning apparatus, as shown in FIG. 6, where an extrusion tube is connected to a syringe on its proximal side and connected to a needle on its distal side. The needle is situated directly above the surface of a coagulation bath in a beaker and a high voltage was applied between the needle and bath. With the needle 1 mm above the coagulation solution surface and with a 30-degree angle tilted with respect to the horizon, GOABs with controlled size were continuously prepared. The size of needle determines the original size of ejection, while the applying of high voltage further minimizes droplet size. The position and the angle of the needle with respect to the coagulation bath surface determine the shape of the beads.

Figure 7A:
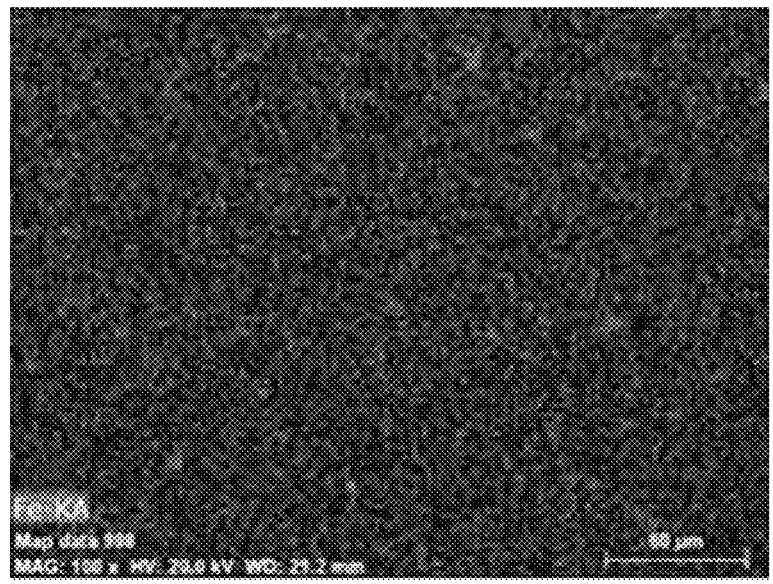
FIG. 7A shows an EDX map of the iron distribution in micro-sized GOAP containing $Fe_3O_4$ nanoparticles dispersed in PPy films that are freshly obtained, according to an embodiment of the invention.
Figure 7B:
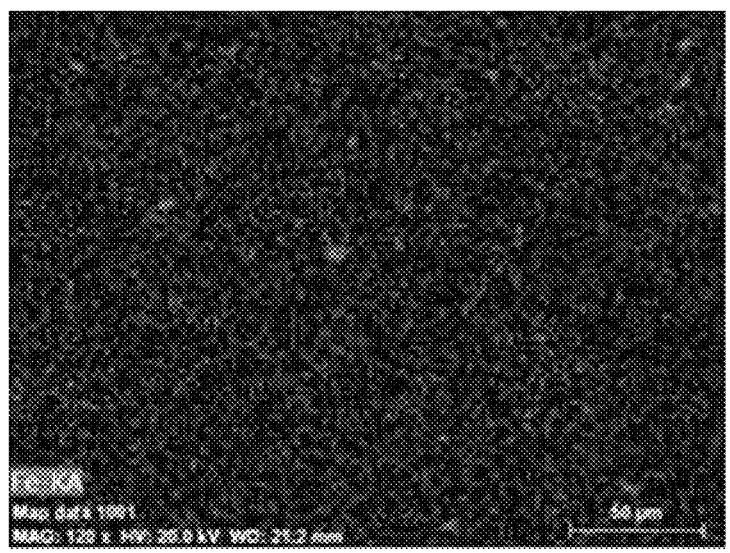
FIG. 7B shows an EDX map of the iron distribution in micro-sized GOAP containing $Fe_3O_4$ nanoparticles dispersed in PPy films of FIG. 7A after three months of storage.

In an embodiment of the invention, polypyrrole (PPy) films are prepared where a PPy aqueous suspension is blended with GOAB that contain Fe$_3$O$_4$ nanoparticles and cast into a PPy film. A PPy suspension is prepared by oxidative polymerization between pyrrole and FeCl$_3$. After adding GOAB containing iron oxide nanoparticles, the suspension is subjected to mechanical agitation and ultrasonication. The suspension was put into a 200 mL plastic container with a flat bottom for heat-drying to form a PPy film. FIGS. 7A and 7B show EDX maps of the iron distribution in the PPy/GO films from a newly obtained dispersion and after storing for three months.

Figure 8A:
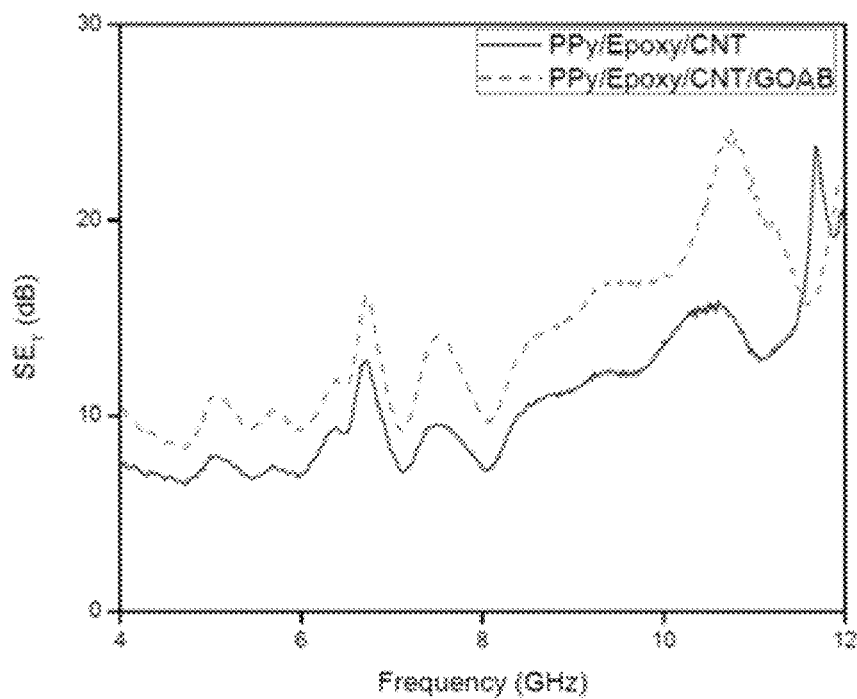
FIG. 8A shows a plot of total shielding efficiency of PPy/Epoxy/CNT and PPy/Epoxy/CNT/GOAB, according to an embodiment of the invention.
Figure 8B:
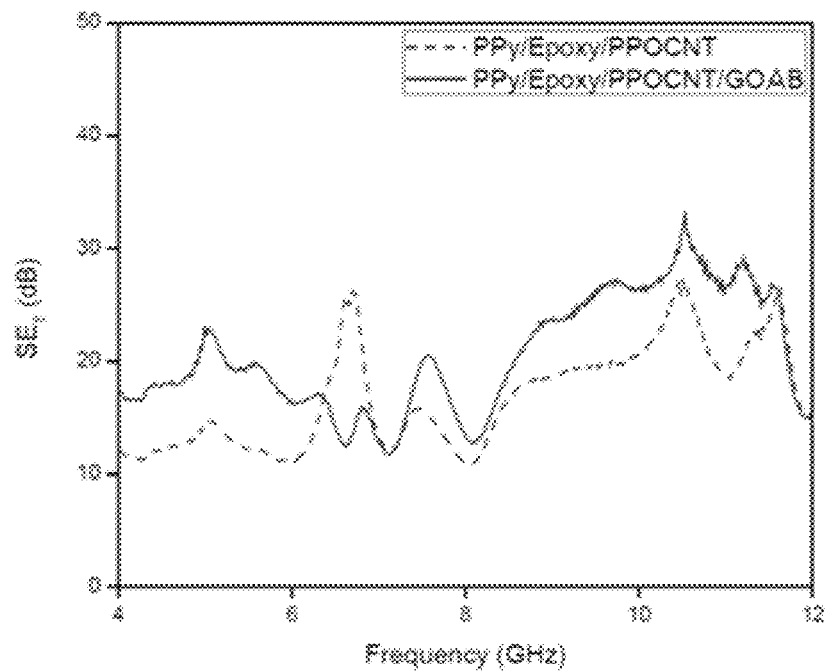
FIG. 8B shows a plot of total shielding efficiency of PPy/Epoxy/PPOCNT and PPy/Epoxy/PPOCNT/GOAB, according to an embodiment of the invention.

In another embodiment of the invention, the EMI shielding materials are formed from the PPy films and carbon nanotubes (CNTs). As indicated in FIG. 8A epoxy composites of the PPy films with micro-size GOABs containing iron oxide nanoparticles (epoxy: Sikafloor 156, PPOCNTs: polypyrrole-oxidized carbon nanotubes) provided superior shielding to that of equivalent composites lacking the GOABs. This improvement also extends to the use of polyphenylene oxide modified carbon nanotubes (PPOCNT) as shown in FIG. 8B.

Figure 9:
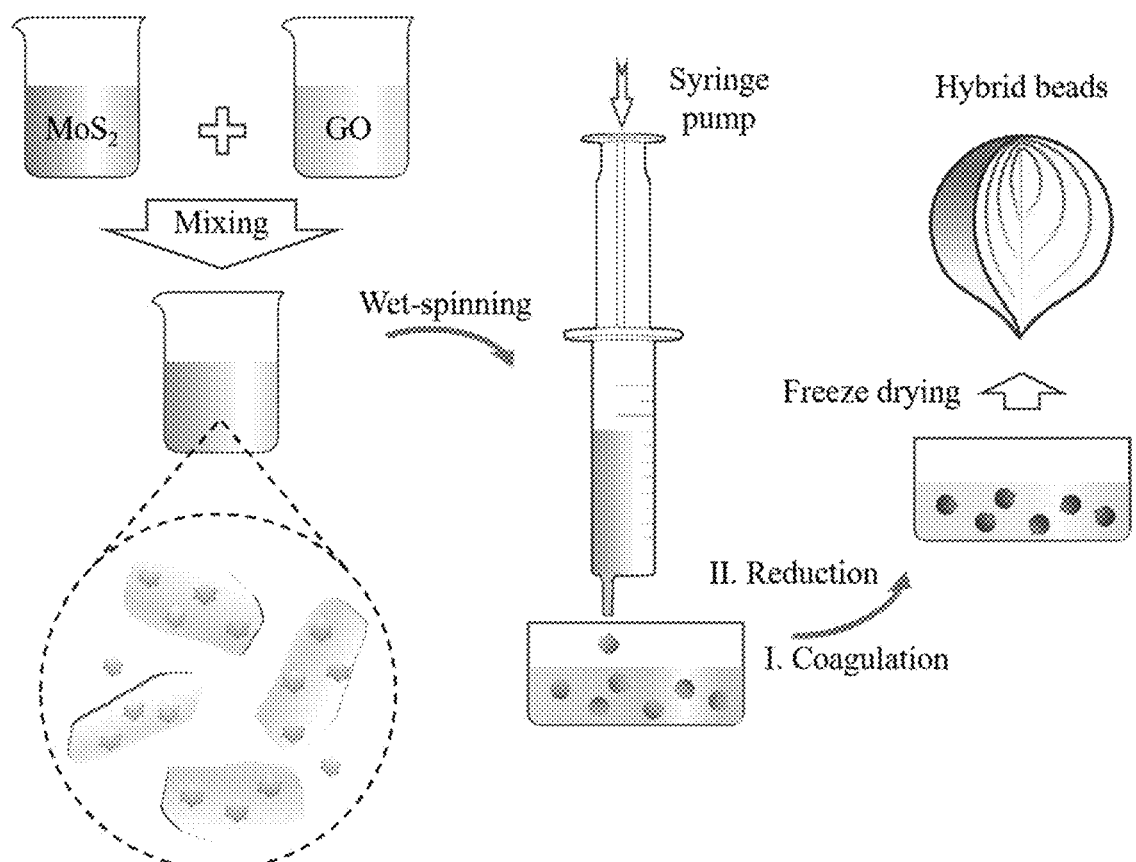
FIG. 9 shows a preparation schemed for the formation of rGOAB/$MoS_2$Abs, according to an embodiment of the invention.

FIG. 9 illustrates the preparation of RGOABs, according to an embodiment of the invention, where the RGOABs are onion-like graphene/MoS$_2$ hybrid aerogel beads (RGO/MoS$_2$ABs). The RGO/MoS$_2$ABs allow a remarkably high water evaporation rate of 0.54 kg/m$^2$/h and 74% energy conversion efficiency under 0.5 kW/m$^2$ illumination in a solar still. Comprising the aerogel beads that display an excellent clean water production rate of 2.0 L/m$^2$/day with a collection efficiency of about 21% under real outside conditions. The high efficiency is attributed to an ameliorating structural and the functional characteristics of onion-like hybrid beads, such as an intrinsic high solar absorption capability, low heat loss to the ambient environment, hydrophilicity, and inherent water paths by capillary force. Notably, the aerogel beads recyclability and their potential for use in a very large area of water make them ideally suited for commercial applications. With these merits, the aerogel beads allow scalable manufacturing of efficient solar thermal aerogel materials for practical water purification applications.

In an embodiment of the invention, unlike the conventional technique for fabricating aerogels using a fixed container, a self-assembly, wet-spinning process was used to prepare RGO/MoS$_2$ABs. A dispersion of MoS$_2$ microflakes mixed with a diluted GO slurry forms a hybrid precursor. After extrusion through the syringe, droplets of the hybrid precursor continuously release into a polyethylenimine coagulation bath. The GO and MoS$_2$ orient during extrusion and self-assembled in the coagulation bath. The internal and external structures of aerogel beads form an onion-like shape ideally suited for solar steam generation by tuning the concentrations and extruding parameters. The RGO/MoS$_2$ABs are reduced to regulate the hydrophilic surface character. The facile and continuous fabrication approach is highly practical for large-scale fabrication of aerogel beads, offering a promising solution for their real-world applications.

Figure 10A:
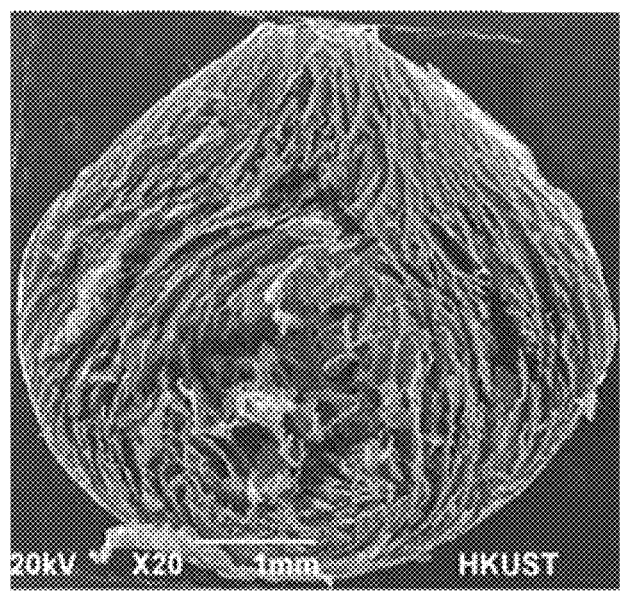
FIG. 10A shows a SEM image of the cross section of a rGO/$MoS_2$AB, according to an embodiment of the invention.
Figure 10B:
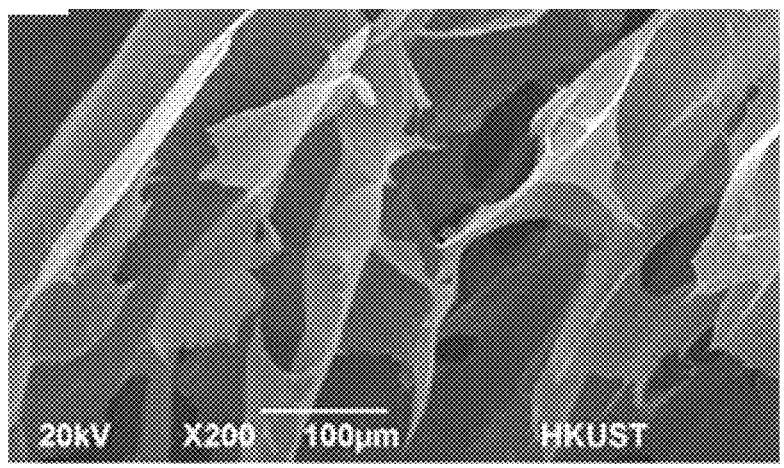
FIG. 10B shows a SEM image of a portion of the cross section of a rGO/$MoS_2$AB, according to an embodiment of the invention, of FIG. 10A at a higher magnification.
Figure 10C:
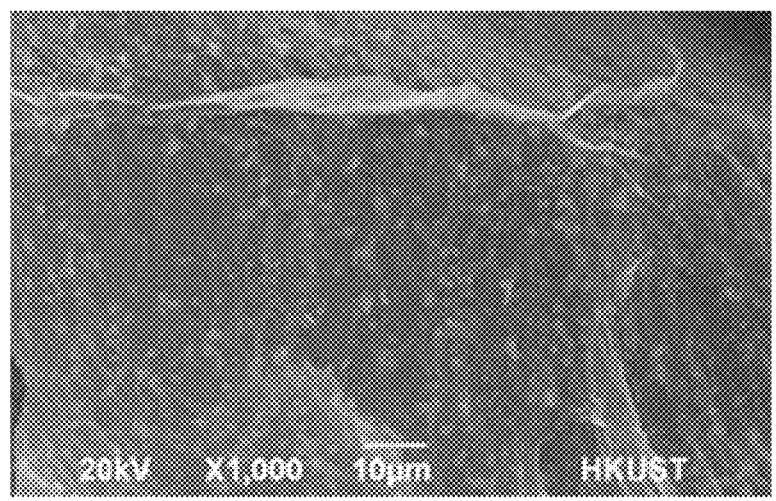
FIG. 10C shows a SEM image of a portion of the cross section of a rGO/$MoS_2$AB, according to an embodiment of the invention, of FIG. 10B at a higher magnification, where the decorations with $MoS_2$ particles are apparent.
Figure 10D:
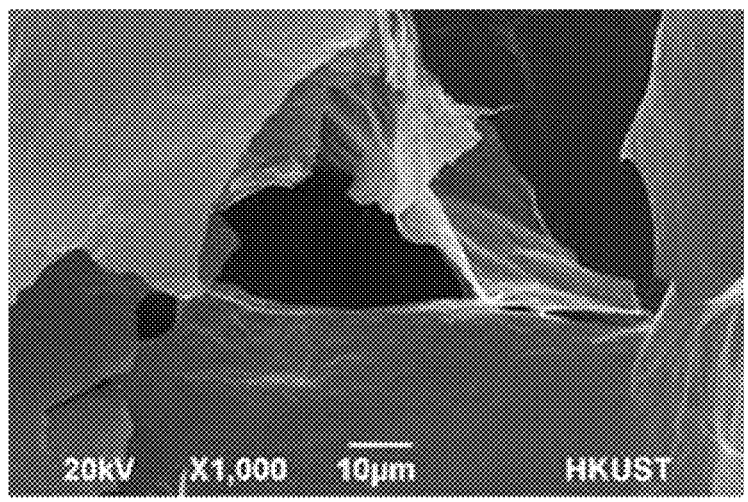
FIG. 10D shows a SEM image of a portion of the cross section a rGOAB, according to an embodiment of the invention, at the same magnification of FIG. 10C where the decorations with $MoS_2$ particles is not apparent.

The scanning electron microscopy (SEM) images of the internal structures of RGO/MoS$_2$Abs taken at different magnifications are shown in FIGS. 10A-10C. Similar to an onion, the vertical sectional morphologies of the aerogel beads exhibit a typical core-shell structure with a circular shell of graphene sheets around a cellular core. FIGS. 10B and 10C present parallel layers with an interlayer spacing of about 100 μm. Compared to the smooth surface of graphene sheets in RGOABs, as shown in FIG. 10D, many protrusions are observed on the surface of the graphene sheets in RGO/MoS$_2$Abs as shown in FIG. 10C. These MoS$_2$ microflakes were tightly attached on the surface of the graphene sheets during the self-assembly process. In contrast to the internal cellular structure, the outside surface of the beads exhibits a continuous self-assembled skin with a wrinkled morphology that are similar to the internal structure with MoS$_2$ microflakes decorating the external surface of the RGO/MoS$_2$ABs, which benefit absorption of light.

EDX characterization reflects the reduction process to form RGOABs and RGO/MoS$_2$Abs, as shown in Table 1, below. The C/O ratio of pristine GO increased from 1.36 to 2.40 after reduction, while the C/O ratio of RGO/MoS$_2$ABs is 2.03. Moreover, the C/O ratio of the external surface of RGO/MoS$_2$ beads is higher than that of the inner surface, which is attributed to the concentration difference of the reducing agent between the bead core and shell. The content of MoS$_2$ on the surface is higher than that in the inner surface. EDX mapping allows monitoring the distribution state of MoS$_2$. The homogenous distributions of all elements indicate a uniform mixture of GO and MoS$_2$ precursors with no agglomeration in the extrusion and coagulation procedures. Raman spectroscopy indicate a structural evolution of RGOABs and RGO/MoS$_2$ABs during reduction where upon the introduction of MoS$_2$, two peaks appeared at 382.9 and 408.7 cm$^{-1}$ in the spectrum of RGO/MoS$_2$ABs, corresponding to the E2g 1 and A1g vibration modes of the MoS$_2$. A slightly higher ID/IG intensity ratio of the RGO/MoS$_2$ABs than that of its RGOABs is consistent with a restriction of the reduction of GO in the vicinity of the MoS$_2$ microflakes, which would be consistent with inhibition by a formation of hydrogen bonds between the hydroxyl groups of GO and the S atom of MoS$_2$.

TABLE 1

EDX Data of the GOABs, RGOABs, and External and Internal RGO/MoS$_2$Abs

| Sample | GO (at %) | RGO (at %) | RGO/MoS$_2$ Ext (at %) | RGO/MoS$_2$ Int (at %) |
|---|---|---|---|---|
| C | 44.4 | 55.6 | 43.9 | 49.9 |
| O | 32.7 | 23.2 | 21.6 | 26.0 |
| N | 21.2 | 17.5 | 17.3 | 17.8 |
| S | — | — | 8.8 | 3.0 |
| Mo | — | — | 4.2 | 1.6 |
| C/O | 1.36 | 2.40 | 2.03 | 1.92 |

Figure 11:
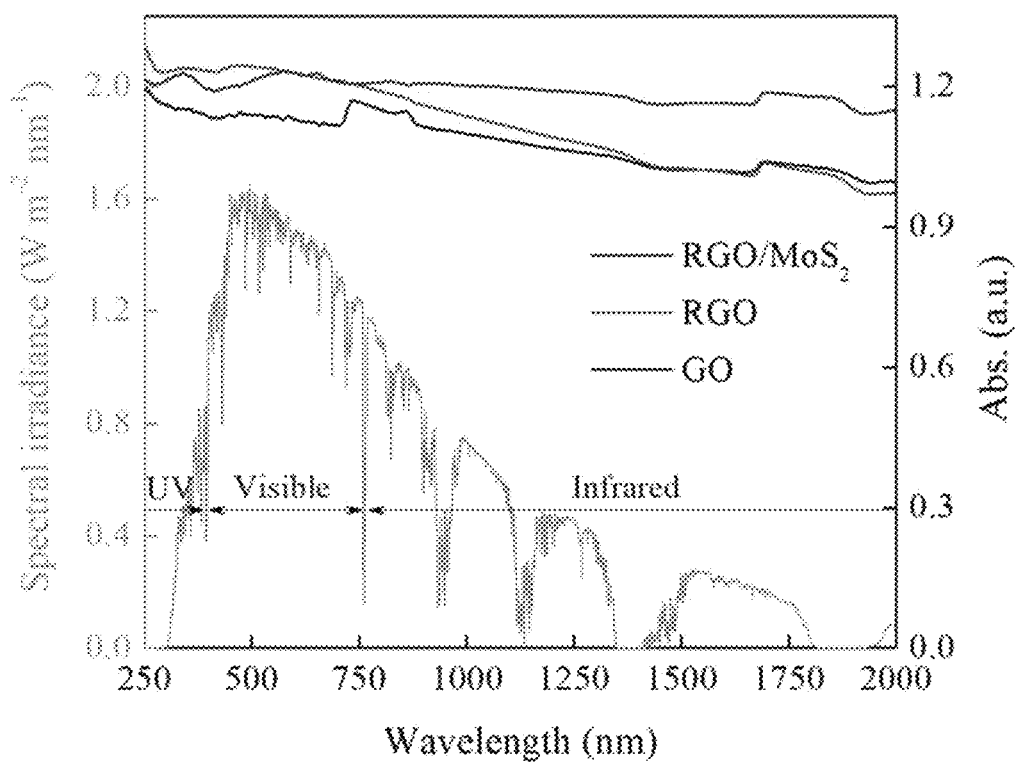
FIG. 11 shows the Standard solar spectrum and a plot of the UV-Vis-NIR absorption spectra of GO, RGO and RGO/$MoS_2$ over the spectral range.
Figure 12A:
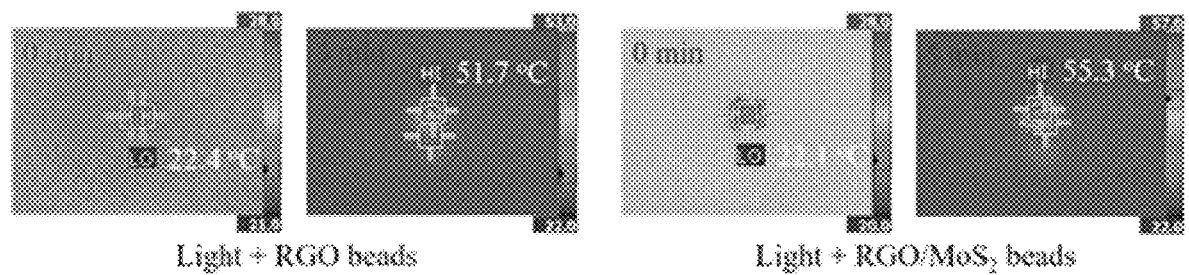
FIG. 12A shows IR thermal images of rGOABs (left) and rGOAB/$MoS_2$ hybrid beads (right), according to an embodiment of the invention, before and after 5 min illumination of 1 $kW/m^2$.
Figure 12B:
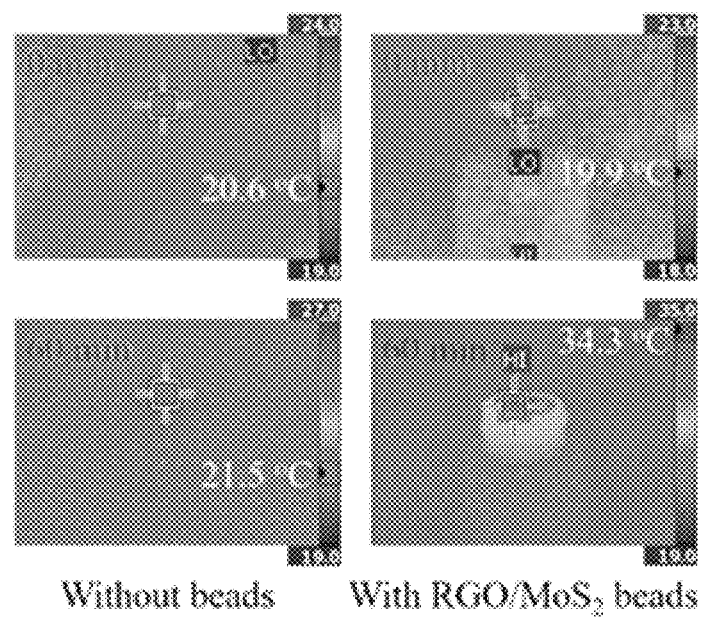
FIG. 12B shows IR thermal images of pure water (left) and water with rGOAB/$MoS_2$ (right), according to an embodiment of the invention, before and after 60 min illumination of 1 $kW/m^2$.
Figure 12C:
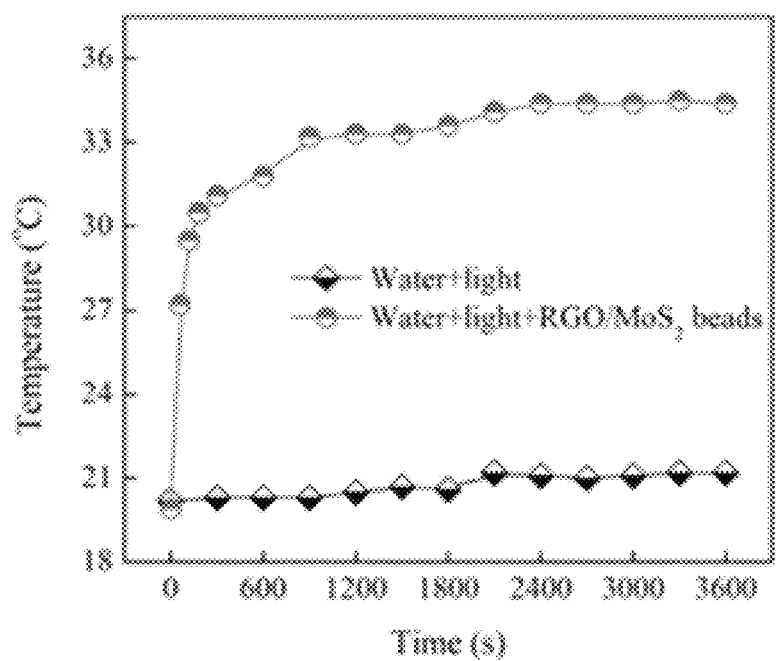
FIG. 12C shows a plot of the temperature rise for the water and the water with RGOAB/MoS$_2$ of FIG. 9B over time as measured by an IR camera.

As revealed by the UV-Vis-NIR spectra in FIG. 11, there are two intrinsic absorption peaks in the wavelengths around 600 nm for the RGO/MoS$_2$ABs, indicating the presence of MoS$_2$ flakes. In the ultraviolet and visible regions, RGOABs and RGO/MoS$_2$ABs samples exhibit stronger absorption than the GOABs. With an increase in wavelength, RGOABs show decreased absorbance, while the RGO/MoS$_2$ABs maintains a remarkable absorption, which is attributed to the good absorption capacity of MoS$_2$ flakes in the near-infrared region. The photothermal performance of two kinds of beads is reflected in infrared (IR) images of the beads under illumination at different times and recorded simultaneously allows characterization of the temperature variations. Upon irradiation at 1 kW/m$^2$, the surface temperature of a RGO/MoS$_2$ABs rapidly increases from 22.4 to 55.3° C. after 5 min of illumination, while the RGO bead displays a relatively low temperature of 51.7° C., as shown in FIG. 12A, indicating that enhanced light absorption capability by addition of MoS$_2$ microflakes, as well as a photothermal effect of the hybrid beads. Additionally, IR images of water with and without the floated RGO/MoS$_2$ABs before and after 60 min of illumination were collected to compare the surface temperature of interfacial water, as indicated in FIG. 12B. The temperature distribution across the air-water interface is uniform, indicating a homogeneous heat localization layer of RGO/MoS$_2$ABs. There was little increase in the surface temperature of water without beads, which contrasts with the increase of the final surface temperature of water with RGO/MoS$_2$ABs reached 34.3° C. The change in temperature of the water with and without the RGO/MoS$_2$ABs is shown in FIG. 12C. The surface temperature of water with RGO/MoS$_2$ABs rapidly increased to about 30° C. and reached a steady-state temperature of 34° C. after about 15 min. The efficient solar-to-heat conversion performance of RGO/MoS$_2$ABs during the water vapor generation process is advantageous for the enhancement of solar stills and other water evaporation processes.

Figure 13A:
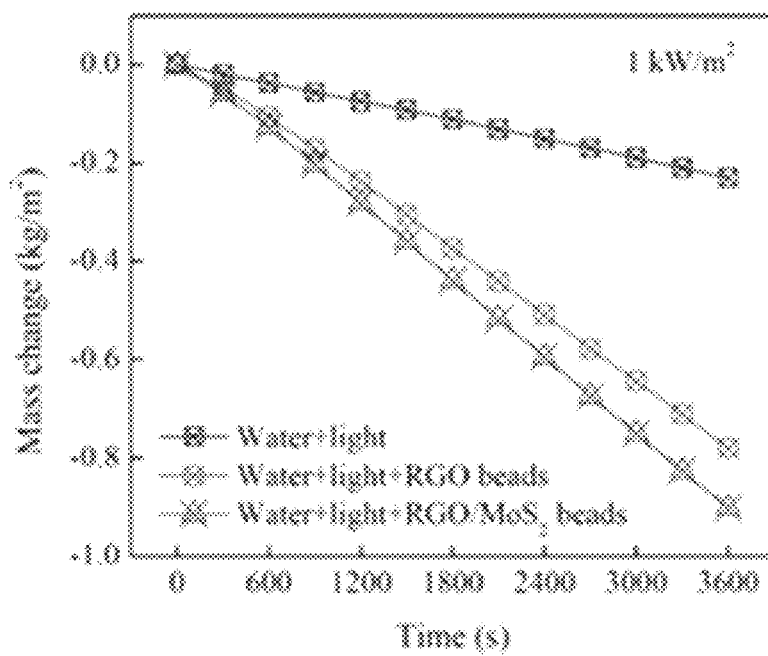
FIG. 13A shows a plot of the water mass change in a light activated water evaporator containing pure water, water with RGOABs and RGO/MoS$_2$ABs, according to an embodiment of the invention, under an illumination of 1 kW/m$^2$.

The strong photothermal capability combined with the scalable fabrication capability makes the graphene aerogel beads useful for water evaporation/desalination applications. The water evaporation performance of graphene aerogel beads floated on the water surface of a vapor generator without any insulation support or water supply component is probed by placing a bath on a precision balance and exposing the surface to an adjustable illumination. FIG. 13A shows the mass of water without the light absorber gradually decreasing with an intensity of illumination of 1 kW/m$^2$. In contrast, water with a single layer of the RGO/MoS$_2$Abs at 98 g/m$^2$, evaporates at a high mass loss rate of 0.90 kg/m$^2$ after 60 min of illumination, which is significantly greater than that of water free of beads of 0.23 kg/m$^2$, or that using RGOABs, 0.78 kg/m$^2$. The heat localization of GOABs drastically improves water evaporation performance, particularly with inclusion of the strong visible and near-infrared absorbing MoS$_2$ microflakes.

Figure 13B:
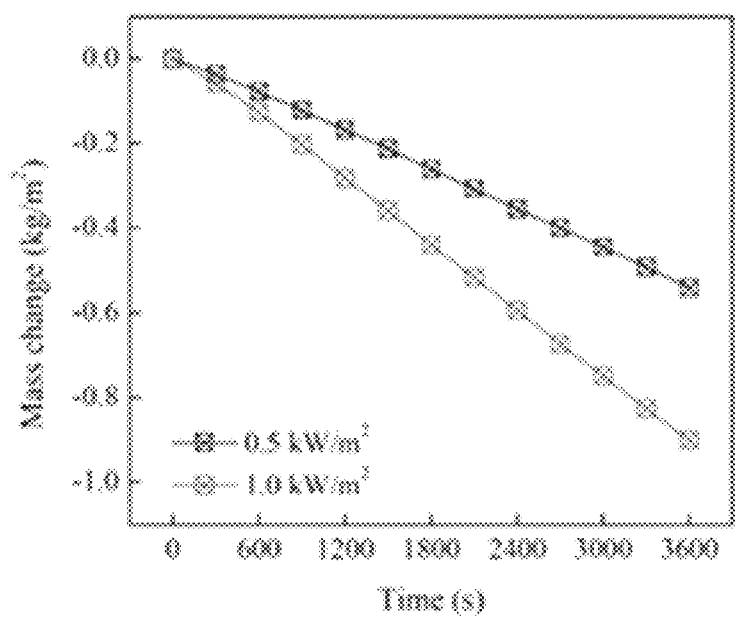
FIG. 13B shows a plot of the water mass change in a light activated water evaporator containing one layer (~98 g/m$^2$) of RGO/MoS$_2$ABs, according to an embodiment of the invention, under different illumination intensities.
Figure 13C:
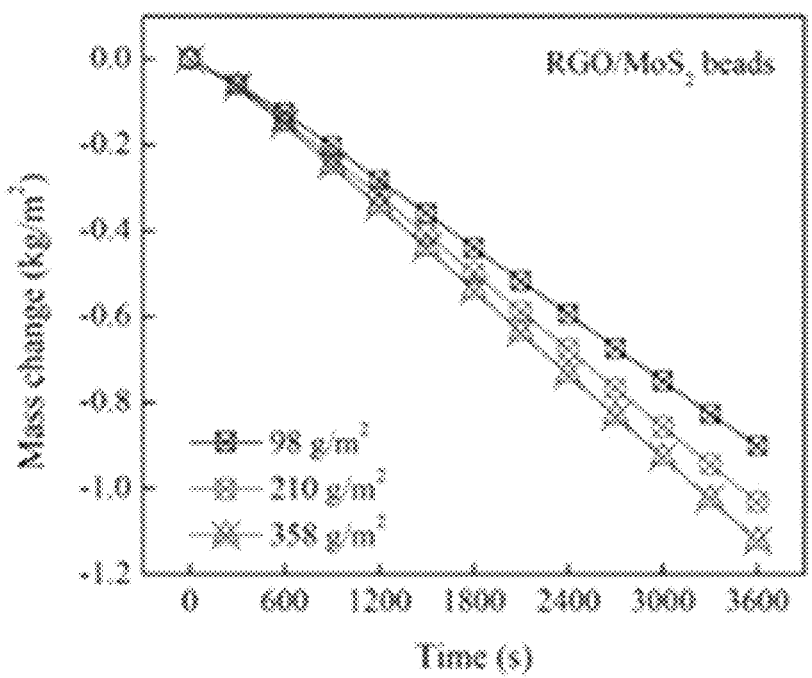
FIG. 13C shows a plot of the water mass change in a light activated water evaporator containing one (98 g/m$^2$), two (210 g/m$^2$), and three layers (358 g/m$^2$) of RGO/MoS$_2$ABs, according to an embodiment of the invention, under illumination of 1 kW/m$^2$.

Optimal water evaporation for the exemplary RGO/MoS$_2$ABs comprising device occurs with greater illumination intensities and with multiple layers of beads, as illustrated in FIGS. 13B and 13C. Using a relatively low illumination of 0.5 kW/m$^2$, the water mass loss rate for a single layer of RGO/MoS$_2$ABs of 0.54 kg/m$^2$, as shown in FIG. 13B, is observed over a 1 h period, which is a reasonably high solar vapor generation performance. By increasing the number of layers of RGO/MoS$_2$ABs from one to three, having 98, 210 and 358 g/m$^2$, only a modest improvement in the mass loss rate from 0.90 to 1.12 kg/m$^2$ was observed, as shown in FIG. 13C.

Figure 13D:
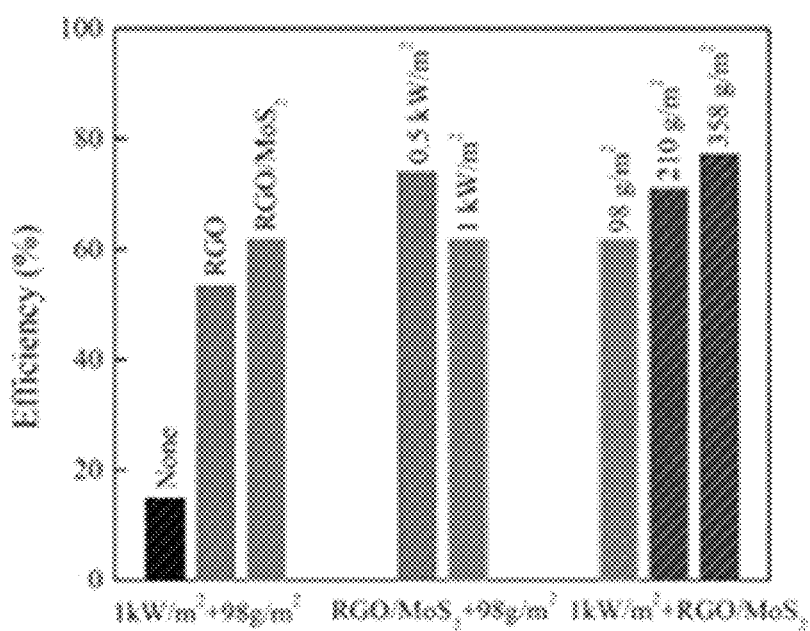
FIG. 13D shows a bar graph water vaporization efficiencies of the light activated water evaporator with different compositions, illuminations and layers of RGO/MoS$_2$ABs, according to an embodiment of the invention.

Overall solar-to-vapor efficiency, the energy conversion efficiency, η, for the water mass loss rate is:

$$\eta = \dot{m} h_{LV}/I$$

where $\dot{m}$ is the mass loss rate measured from the slope of the mass loss curves at steady state, $h_{LV}$ is the total enthalpy of the sensible heating and liquid-vapor phase change, and I is the power density of illumination. The evaporation rate in a dark environment was subtracted from the measured evaporation rate to calculate the steam generation efficiency. The conversion efficiencies of the water evaporation device comprising ROGOABs and RGO/MoS$_2$ABs under various conditions are plotted in FIG. 13D. At 1 kW/m$^2$ solar intensity, the evaporation efficiency of the single layer of RGO/MoS$_2$ABs is 62.1%, as compared to RGOABs of 53.6% and pure water of 15.2%. The evaporation efficiency of the RGO/MoS$_2$ABs comprising device increases to 74.3% when the power density of illumination is reduced to 0.5 kW/m$^2$, which indicates an excellent suitability of the RGO/MoS$_2$Abs beads for the generation of freshwater. By increasing the number of RGO/MoS2 bead layers, the evaporation efficiency under 1.0 kW/m$^2$ illumination increases slightly, reaching 77.4% for three layers.

Figure 14A:
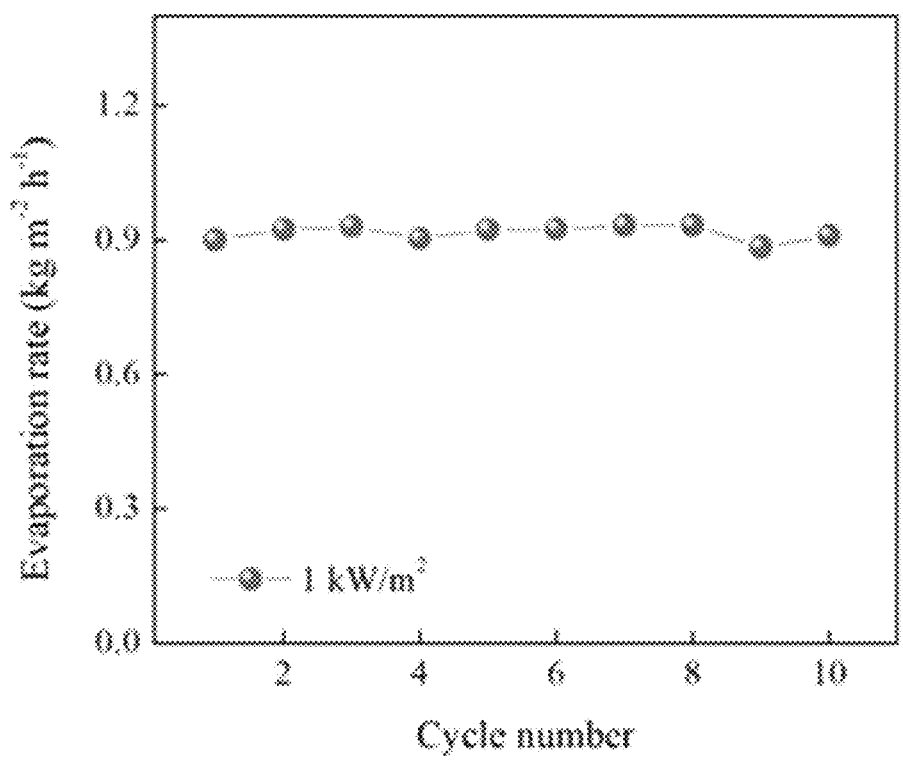
FIG. 14A shows a plot of the evaporation rate of a light activated water evaporator comprising RGO/MoS$_2$ABs for 10 cycles using an illumination of 1 kW/m$^2$.
Figure 14B:
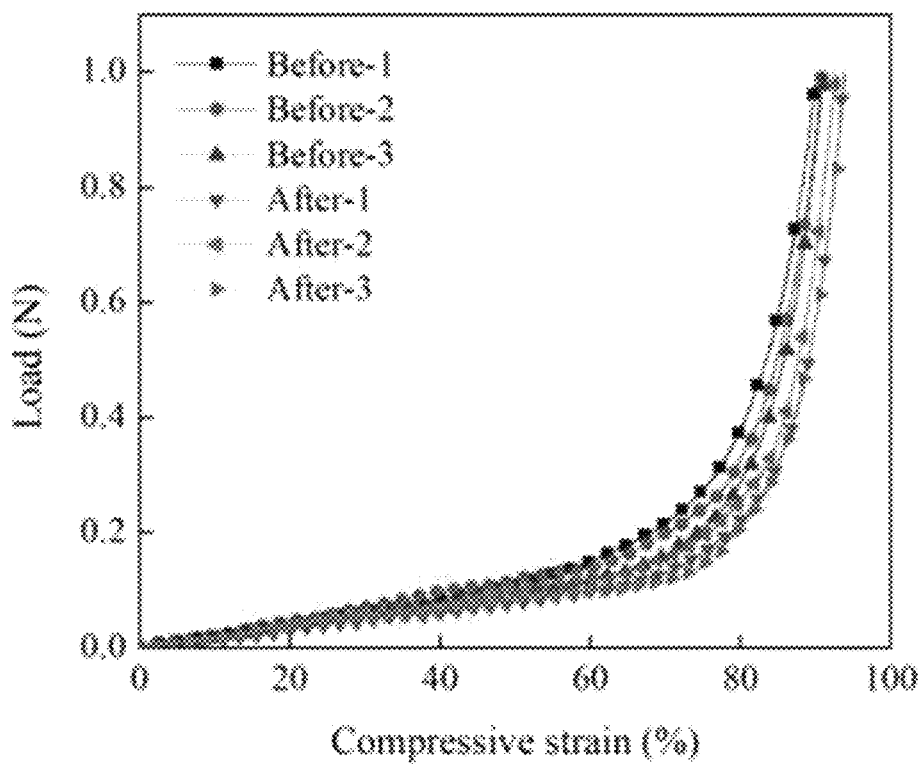
FIG. 14B shows a plot of a compression load before and after three different runs of the light activated water evaporator with RGO/MoS$_2$ABs, according to an embodiment of the invention, demonstrating little loss of integrity upon use.

The durability and salt resistance of solar absorbers comprising RGO/MoS$_2$ABs have been characterized. FIG. 14A shows the retention of efficiency over multiple cycles, with each cycle lasting for 1 h without any thermal insulation. The RGO/MoS$_2$ABs immersed in seawater dry at ambient temperature with little change of their original shape and size. A compression test characterizes the structural stability of RGO/MoS$_2$ABs where a compressive load is imposed on dried RGO/MoS$_2$ABs after cycling and fresh RGO/MoS$_2$ABs for a given strain results in the load-deformation shown in FIG. 14B. There is little reduction in compression load with use that is imposed by marginal morphological change of the beads due to drying. The morphology of the dried RGO/MoS$_2$ABs retains the original onion-like structure with well-spaced RGO/MoS$_2$ sheets separated by large pores. The overall cellular inner structure of aerogel beads remains intact although some regional deformation of the skeleton is observed. Accumulated of salt particles has the potential to clog water passageways and deteriorate the water evaporation rate over time. However, with stirring and washing with seawater, almost no salt particles formed on the RGO/MoS$_2$ABs. Even without washing, few salt particles can be detected on the surface of graphene sheets in the RGO/MoS$_2$ABs.

Figure 15A:
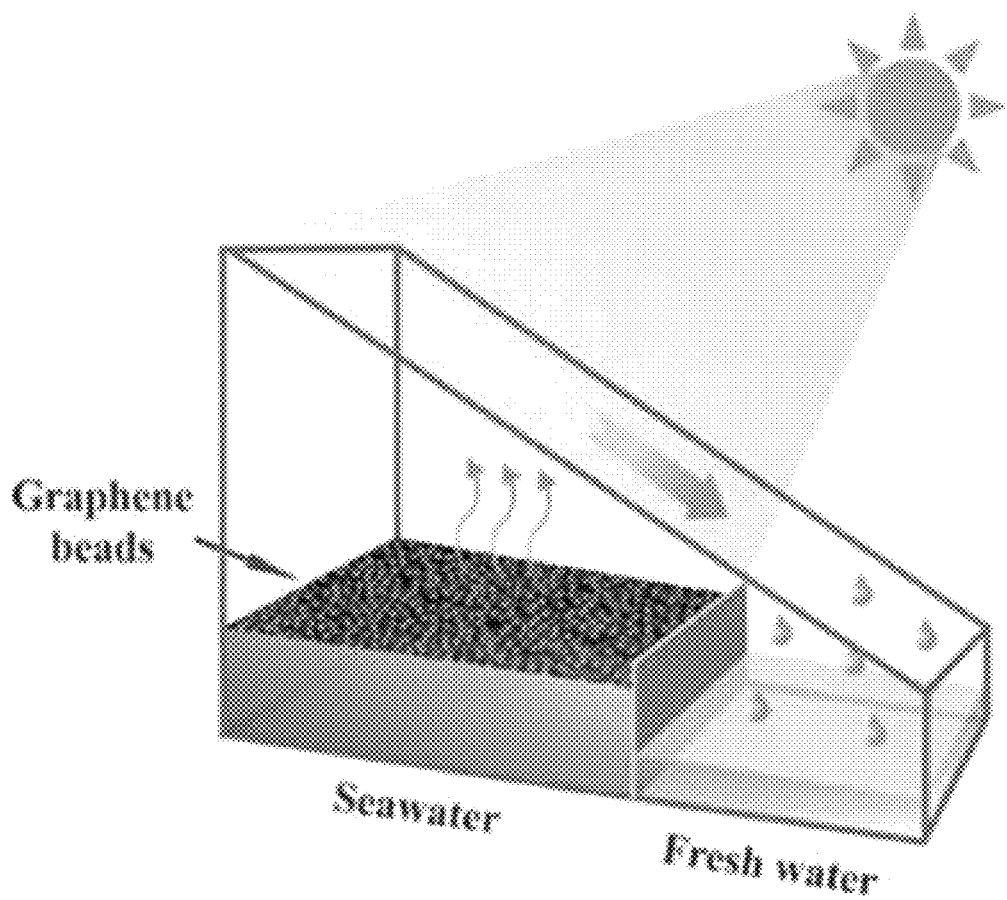
FIG. 15A shows a drawing of a solar still for seawater desalination using RGO/MoS$_2$ABs, according to an embodiment of the invention.
Figure 15B:
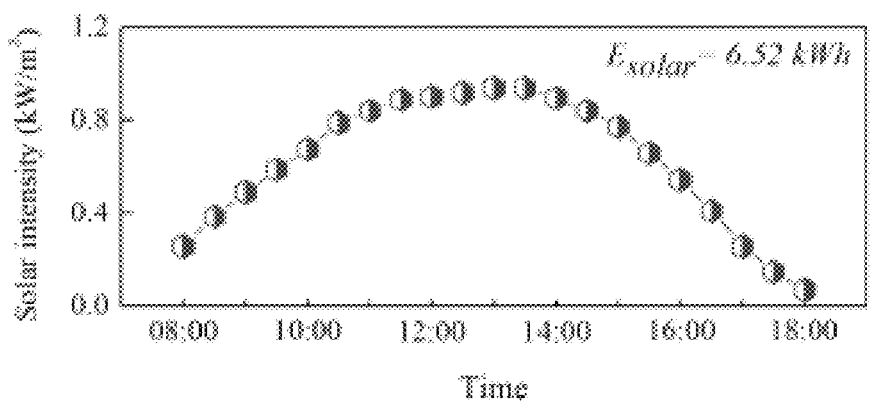
FIG. 15B shows a plot of the solar intensities over a 10 hour period of sunlight use of a solar still for seawater desalination using RGO/MoS$_2$ABs, according to an embodiment of the invention.
Figure 15C:
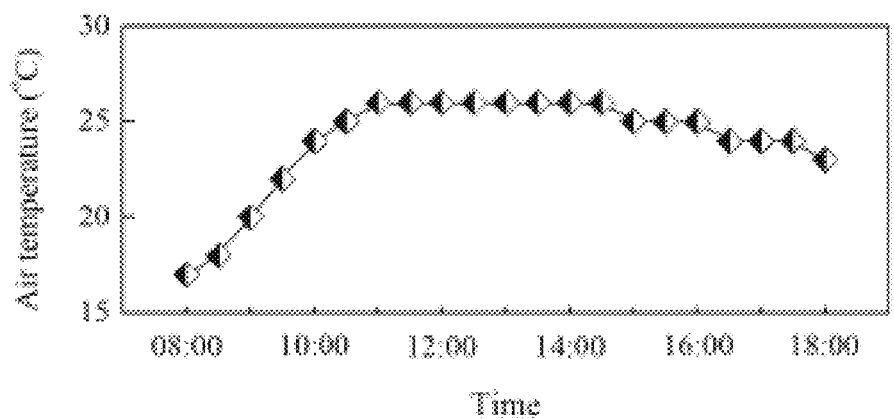
FIG. 15C shows a plot of the air temperatures over a 10 hour period of sunlight use of a solar still for seawater desalination using RGO/MoS$_2$ABs, according to an embodiment of the invention.
Figure 15D:
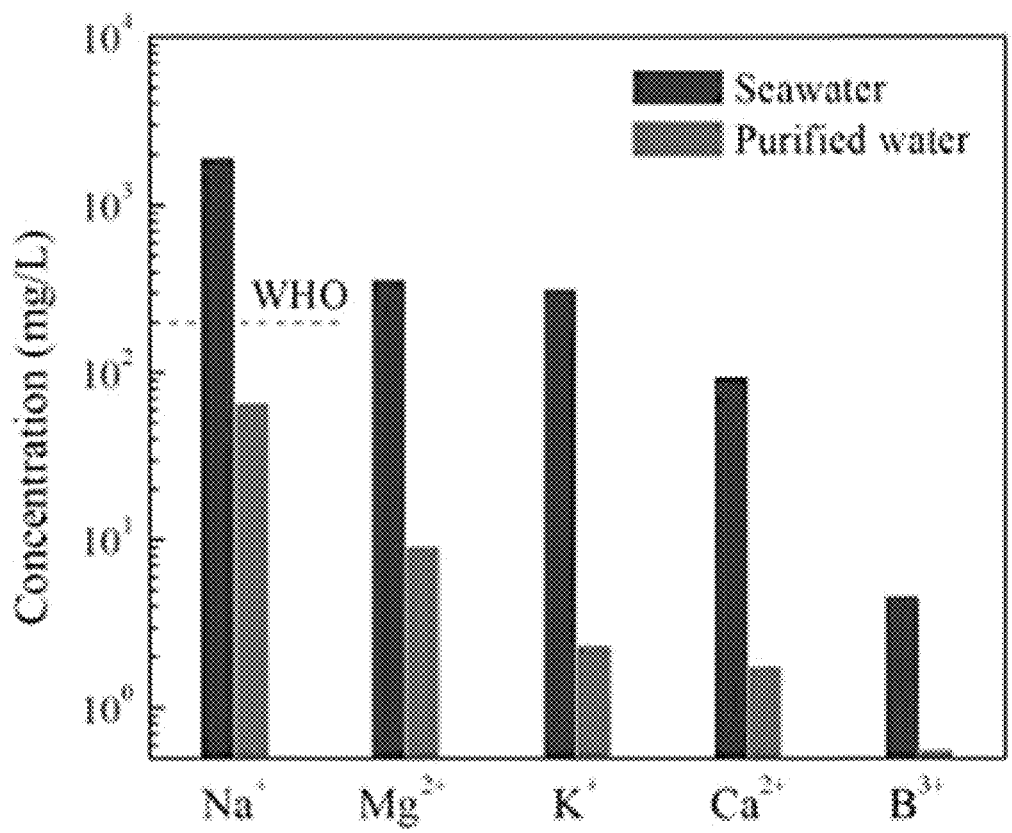
FIG. 15D shows a bar graph for the primary ion concentrations in the sea water used and purified water formed using the solar still, according to an embodiment of the invention, as determined using an Inductively Coupled Plasmaoptical Emission Spectrometry (ICP-OES).

A typical solar still using the RGO/MoS$_2$ABs demonstrates desalination performance under natural light under real environmental conditions. FIG. 15A shows the device schematically. The sunlight is absorbed by the beads floating on seawater contained in an evaporation box to generate water vapor. A tilted transparent glass covers the box to condense the water vapor and drain the liquid water in a collection box adjacent the evaporation box. A representative sunny day, characterized by the solar intensity curve of FIG. 15B and the temperature profile of FIG. 15C, is imposed to conduct the test. A maximum intensity of 940 W/m$^2$ and an ambient temperature of about 26° C. with a total daily solar insolation of 6.52 kWh occurs. The solar device with an active area of about 0.05 m$^2$ distils 100.1 g of purified water over a 10 hr period with no auxiliary components for assisting the thermal management and augmenting the water supply or path. The exemplary solar still produces freshwater at a rate of 2.0 L/m$^2$ day, which is sufficient to provide drinking water for an individual in a day. The collection efficiency or daily-averaged solar to-water efficiency is about 21%, as calculated by the equation:

$$\eta_{collection} = \frac{m_{cond} h_{LV}}{A_{evap} \int q_{solar}(t) dt'},$$

where $\eta_{collection}$ is the water collection efficiency, $A_{evap}$ is the mass of condensate collected daily, $q_{solar}(t)$ is the time-dependent solar intensity, and the denominator is the total daily solar energy. Inductively coupled plasmaoptical emission spectrometry (ICP-OES) characterizes the concentrations of primary ions in the seawater and purified water, to yield the results shown in FIG. 15D. The concentrations of tested ions are much decreased and concentrations of Na ions are below the World Health Organization (WHO) standard of 200 mg/L for drinking water. The electrical resistances of real seawater, purified water and commercial distilled drinking water measured using a multimeter suggest high purities of the water samples. The resistance of collected water is significantly higher than that of seawater, i.e. 1.53 MU vs. 36.33 kU, and is comparable to that of a commercial distilled drinking water of 5.66 MU. These results demonstrate the excellent desalination performance of the RGO/MoS$_2$ABs in a viable solar vapor generation device.

MATERIALS AND METHODS

Materials

GO slurry (2.0 wt %, 0.2~10 μm) was purchased from Shanghai Ashine Technology Development Co., Ltd., China. MoS$_2$ (99.5%, <2 μm) and tetradecanol were provided by Shanghai Aladdin Bio-Chem Technology Co., Ltd. Sodium hydroxide (≥98%), L-Ascorbic acid, NaOH, Pyrrole, iron chloride powder and polyethylenimine (branched, average Mw~800) were bought from SigmaAldrich. Iron oxide nanoparticle (20-30 nm) were supplied by US Research Nanomaterials. Multiwall carbon nanotubes (NANOCYL® NC7000) were purchased from Nanocyl Co.

Characterization

Scanning electron microscopy was performed using a JSM-6390, JEOL. Raman spectroscopy was performed on a Micro-Raman spectroscopy, InVia, Renishaw, with excitation provided in back-scattering geometry by a 514.5 nm argon laser line. Transmission electron microscopy (TEM) was performed using a JEM 100CXII, JEOL. Thermographic images were taken by a Fluke Ti25 Thermal Imager. Contact angle test was conducted on a contact angle meter (Attension Theta Lite, Biolin Scientific). Mechanical performances of graphene aerogel beads were characterized by a micro-compression device developed by Sottos et al. Solar intensity was tested by a solar power meter (ISM 410, ISO-TECH). Absorbance spectra were monitored using a UV-Vis-NIR spectrophotometer, 3700DUV, Shimadzu. Concentrations of ions were tested using Inductively Coupled Plasma-Optical Emission Spectrometer (ICP-OES), 725-ES, Varian, Australia. The adsorption capacity of rGOABs was investigated by thermogravimetric analysis (TGA TA-Q5000) of pure TD paraffin, GOABs and rGOABs impregnated with TD paraffin were heated to 800° C. at a heating rate of 20° C./min in a nitrogen atmosphere. The thermal dynamic properties of pure TD, GOAB/TD and rGOAB/TD composites during heating and cooling cycles were investigated by differential scanning calorimetry (DSC TA-Q2000). The scattering parameters (S-parameters) and real and imagine permeability and permittivity were obtained by putting the films in a sample holder of the waveguide tube, connected to vector network analyser (KEYSIGHT E5071C). Electrical conductivity was measured by Hall effect measurement system Ecopia HMS-5500. Magnetic properties were investigated by a vibrating sample magnetometer (VSM, LakeShore 7300).

Synthesis of GOABs

GOABs were fabricated via a wet-spinning method. Graphene oxide aqueous slurry was extruded from syringe needle into 1 wt % PEI aqueous solution to form stable beads and the slurry maintained for 3 hours. These water-contained beads were rinsed with DI-water and collected for freeze-drying. The GOABs were annealed at 1,100° C. to obtained reduced graphene oxide aerogel beads (RGOABs).

Absorption of TD PCM into GOABs

A solid-state paraffin wax was placed in an oven at 55° C. for melting. The rGOABs were soaked with the liquid paraffin to absorb wax. After 5 min, the rGOABs impregnated with paraffin wax were collected and washed with alcohol at room temperature to remove paraffin adhered on the outer surface of the beads and to separate agglomerated GOABs, followed by air drying.

Electrospinning of Micro-Size GOABs

An extrusion tube is connected to a syringe on its proximal side and connected to a needle on its distal side. The needle is situated directly above the surface of a coagulation bath in a beaker and high voltage was applied to the needle. With the needle 1 mm above the coagulation solution surface and with a 30-degree angle tilt with respect to the horizon, GOBs with controlled size were continuously prepared. The size of needle determines the original size of ejection while the applying of high voltage further minimizes droplet size. The position and the angle of the needle with respect to the coagulation bath surface determine the shape of the beads.

Fabrication of Ferromagnetic Nanoparticles Contained EMI Shielding Film

PPy films were synthesized via chemical oxidation in aqueous solution by slowly adding an oxidizing solution of $FeCl_3$ to a cool solution of pyrrole. The synthesis was performed without agitation and under nitrogen. The polypyrrole precipitate was collected by filtration, rinsed with distilled water and kept as a PPy aqueous suspension and blended with GOAB containing $Fe_3O_4$ nanoparticles. The suspension was put into a 200 mL plastic container for heat-drying to form a PPy film.

Fabrication of RGO/$MoS_2$Abs

To achieve the complete movement and rearrangement of GO sheets in one droplet, and form the onion-like structure. The concentration of the GO solution and the extruding speed was reduced to about 3 mL/min. A 0.2 g $MoS_2$ quantity of microflakes was dispersed in 120 mL DI water through simultaneously stirring and sonicating. Subsequently, 80 g of a GO slurry (1.0 wt %) was mixed with the $MoS_2$ dispersion by mechanical stirring to form a hybrid solution. After degasification, the GO/$MoS_2$ hybrid solution was extruded into the a polyethylenimine coagulation bath (1.0 wt %) by a syringe with a die diameter of about 2 mm using a stepper motor at 3.0 mL/min. The resulting wet GO/$MoS_2$ABs were coagulated over one day and washed with DI water five times. The GO/MoS2 hybrid beads were reduced in 200 mL of sodium ascorbate solution (0.04 mol/L) at 90° C. for 24 h followed by freeze drying or directly drying in air after an ethanol-water replacement.

All publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application and the scope of the appended claims. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

We claim:

1. Graphene oxide aerogel beads (GOABs), comprising a core/shell structure having a smooth shell and a multi-layer core, where the smooth shell and the layers of the multilayer core comprise graphene oxide or reduced graphene oxide and $MoS_2$ microflakes, where the layers of the multilayer core are separated by about 1-50 μm.

2. The GOABs according to claim 1, wherein the GOABs are 0.1 to 10 mm average diameter.

3. The GOABs according to claim 1, further comprising a phase-change material encapsulated within the multi-layer core.

4. The GOABs according to claim 3, wherein the phase-change material is a wax.

5. The GOABs according to claim 4, wherein the wax is tetradecanol.

6. The GOABs according to claim 1, further comprising $Fe_3O_4$ nanoparticles.

7. A method of preparing GOABs according to claim 1, comprising:
   providing an aqueous slurry of graphene oxide;
   providing a dispersion of $MoS_2$ microflakes:
   mixing the aqueous slurry of graphene oxide and the dispersion of $MoS_2$ microflakes to form a mixture:
   extruding drops of the mixture into a coagulation bath containing an aqueous solution of a coagulant wherein the GOABs are formed;

separating the GOABs from the coagulation bath;
washing the GOABs with water;
freeze drying the GOABs; and, optionally,
reducing the graphene oxide of the GOABS.

8. The method according to claim 7, wherein the coagulant is CTAB or PEI.

9. The method according to claim 7, wherein extruding is by wet-spinning or electrospinning.

10. The method according to claim 7, wherein reducing is thermal reducing or chemically reducing.

11. The method according to claim 10, wherein chemical reducing is adding of a reducing agent.

12. The method according to claim 10, wherein the reducing agent is a sodium ascorbate solution.

13. The method according to claim 7, wherein thermal reducing is heating to a temperature in excess of 1,000° C.

14. The method according to claim 7, further comprising impregnating the GOABS with a phase-change material.

15. The method according to claim 14, wherein impregnating is exposing the GOABs to vacuum to form evacuated GOABS and infusing the evacuated GOABs with the phase-change material in the liquid phase.

16. The method according to claim 14, wherein the phase-change material is a wax.

17. A device comprising the GOABs according to claim 1, wherein the device is an EMI shielding film, a solar still, or a thermal management pack.

18. The device according to claim 17, where the device comprises an electrically insulating matrix.

19. The device according to claim 18, where the electrically insulating matrix is a silicone network.

20. The device according to claim 17, where the device comprises an electrically conductive or semiconductive matrix.

21. The device according to claim 17, where the electrically conductive or semiconductive matrix is a polypyrrole.

* * * * *